United States Patent [19]
Bosche et al.

[11] 3,987,484
[45] Oct. 19, 1976

[54] PROGRAMMED PRESENTATION SYSTEM

[75] Inventors: Robert P. Bosche; Clement W. Munninghoff, both of Cincinnati, Ohio

[73] Assignee: Cincinnati Electronics Corporation, Cincinnati, Ohio

[22] Filed: Nov. 5, 1973

[21] Appl. No.: 412,963

[52] U.S. Cl. .................................. 360/33; 35/24 R; 226/33; 360/72
[51] Int. Cl.² .................. G11B 15/52; G11B 15/22; G11B 15/06
[58] Field of Search .................. 360/72, 33; 226/33; 35/24

[56] References Cited
UNITED STATES PATENTS

| | | | |
|---|---|---|---|
| 3,499,976 | 3/1970 | Lemelson | 360/72 |
| 3,501,851 | 3/1970 | Price, Jr. et al. | 360/72 |
| 3,541,271 | 11/1970 | Joslow et al. | 360/72 |
| 3,714,382 | 1/1973 | Sykes | 360/72 |
| 3,727,203 | 4/1973 | Cressman | 360/72 |
| 3,809,302 | 5/1974 | Maylon | 360/72 |
| 3,812,532 | 5/1974 | Crosser et al. | 360/72 |
| 3,821,710 | 6/1974 | Arciprete et al. | 360/72 |

*Primary Examiner*—Vincent P. Canney
*Attorney, Agent, or Firm*—Lowe, King, Price & Markva

[57] ABSTRACT

A system for automatically supplying information to an operator, such as a student being taught to repair a piece of equipment, includes a magnetic tape storage medium having audio and video information storage tracks. A coded data signal track having indicia for locations of the information on the video and audio tracks is provided. An operator station includes keys for entering answer and command signals that control movement of the tape, so that the tape is advanced at a normal speed whereby the audio and video information is presented to the operator at a normal rate, the medium is advanced at a high speed to minimize the time that no meaningful information is presented to the operator, the medium is reversed at high speed, or stopped. Indexing of the tape can be performed by the operator selecting predetermined location indicia or in response to the operator selecting certain commands or answers in response to the audio and video information presented to the operator. For example, the operator can request certain portions of the audio and video information to be repeated or skipped, in which cases the tape is rewound or advanced at high speed to portions of the tape indicated on the tape itself. In response to questions presented to the operator by the audio information and answers given by the operator, branching to different portions of the tape is performed by advancing or rewinding the tape at high speed to areas of the tape designated by the signal track indicia. Supervisory control of the actions taken by the operator is provided to selectively prevent or allow the skipping, repeating, fast forward, rewind, play or indexing operations. Pauses in the presentation of the audio visual information can be selectively inserted by the operator independent from signals from the data track.

69 Claims, 20 Drawing Figures

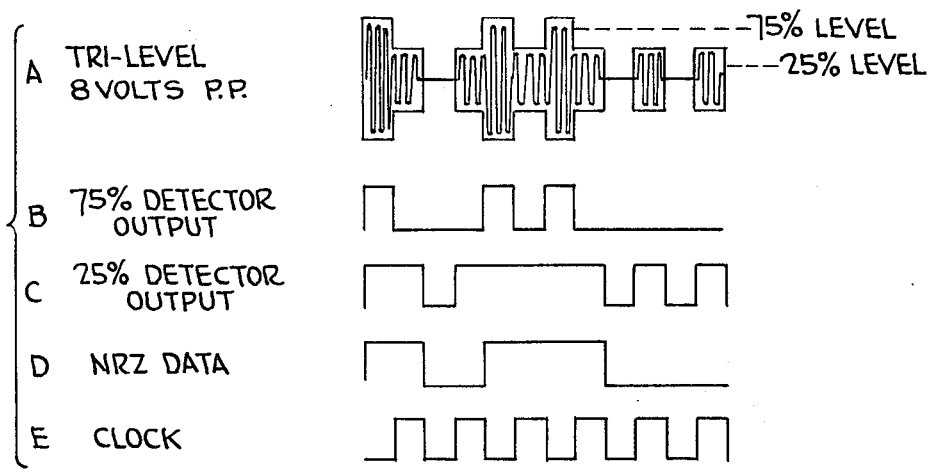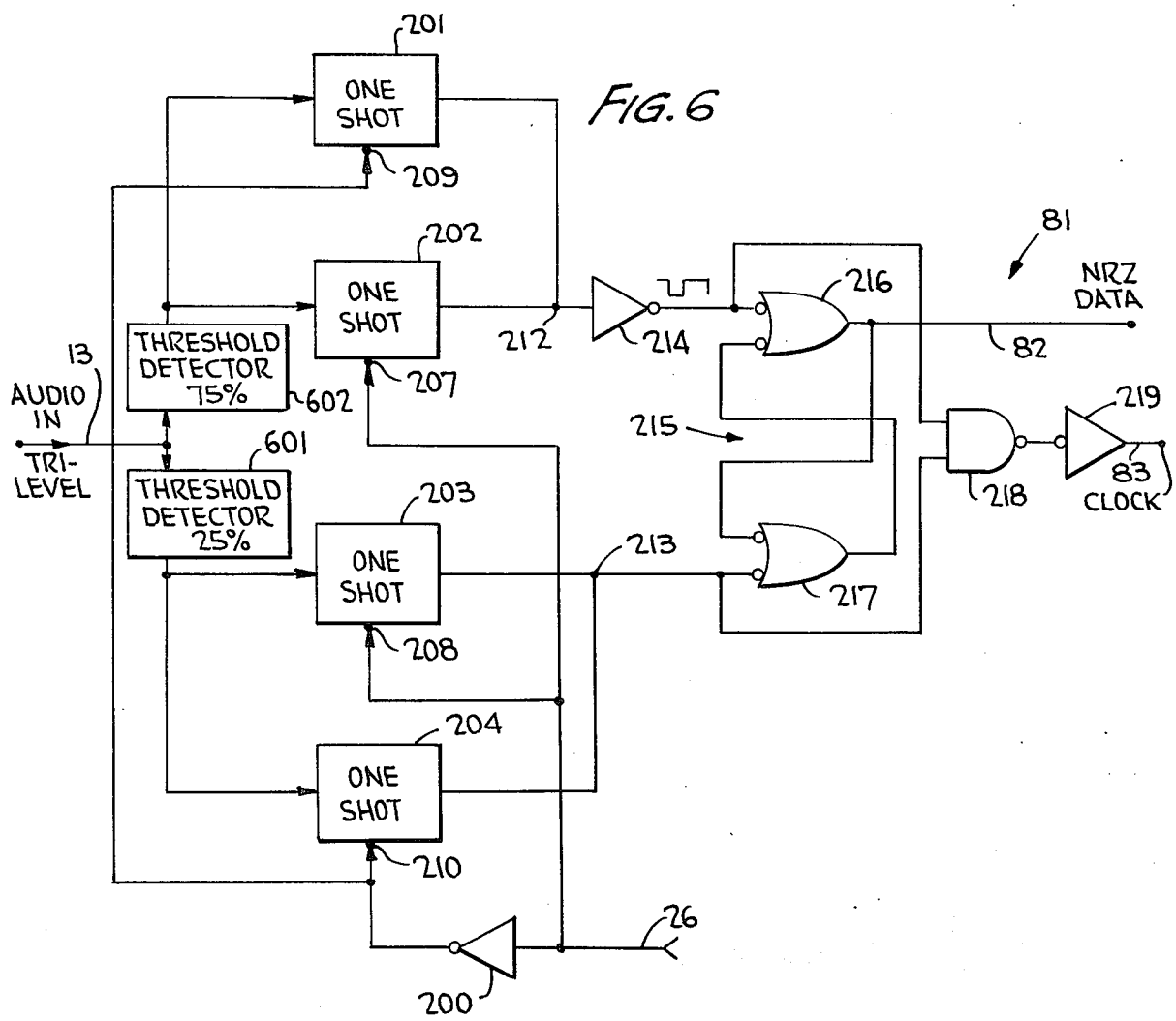

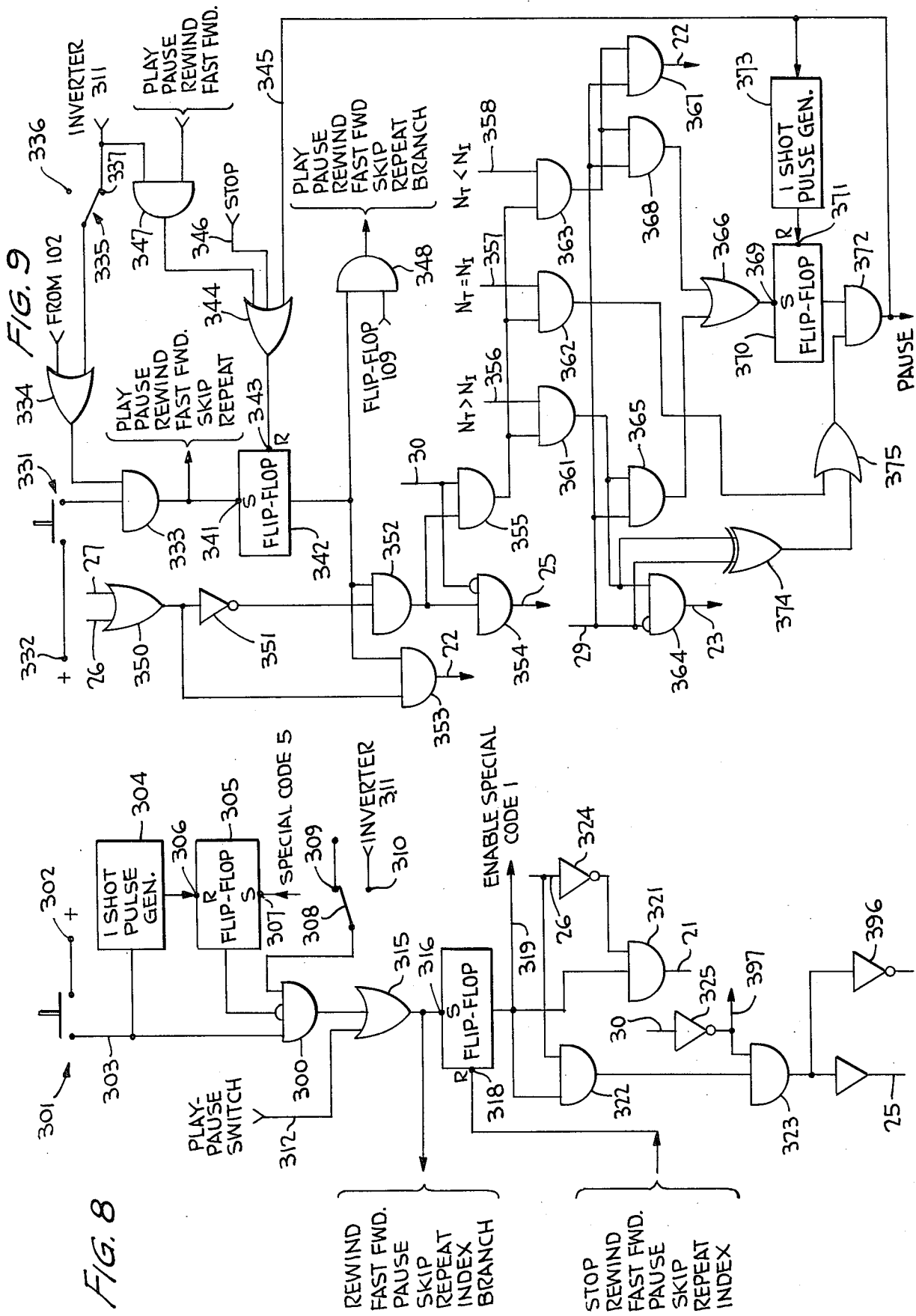

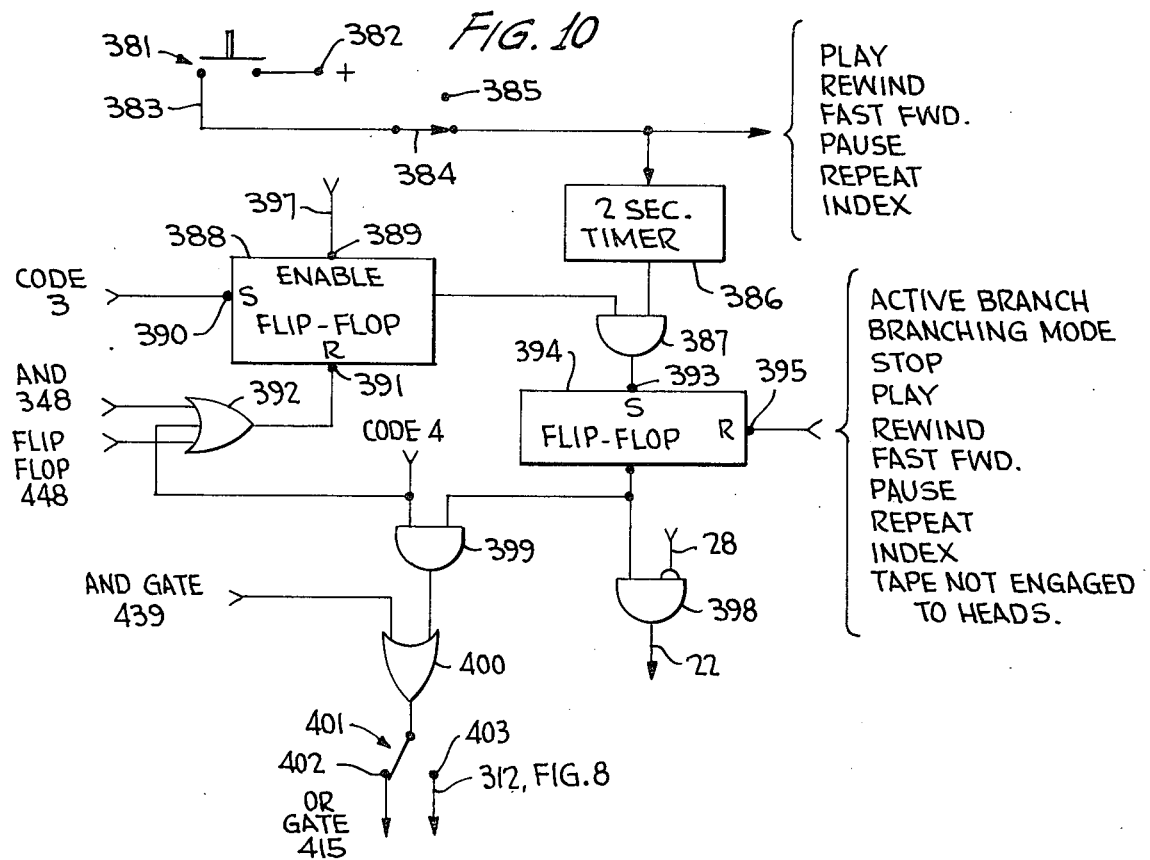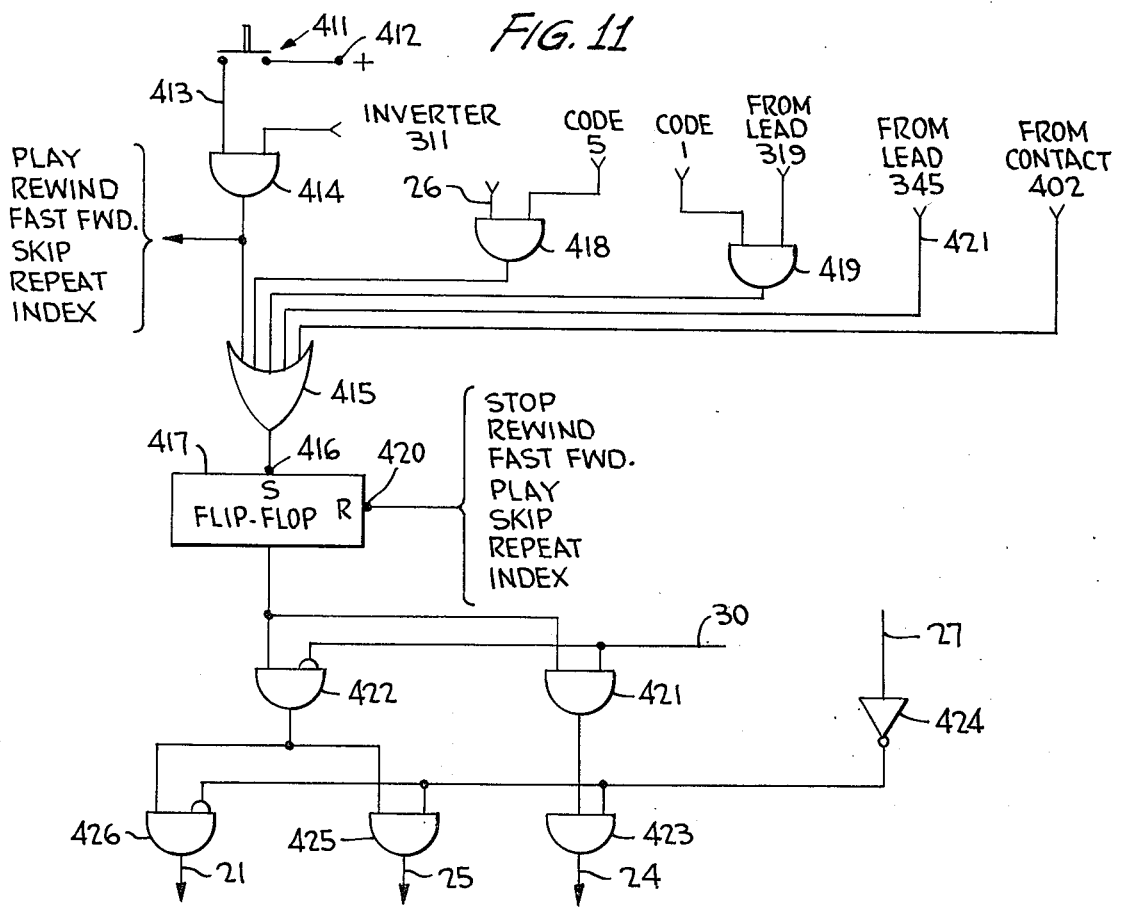

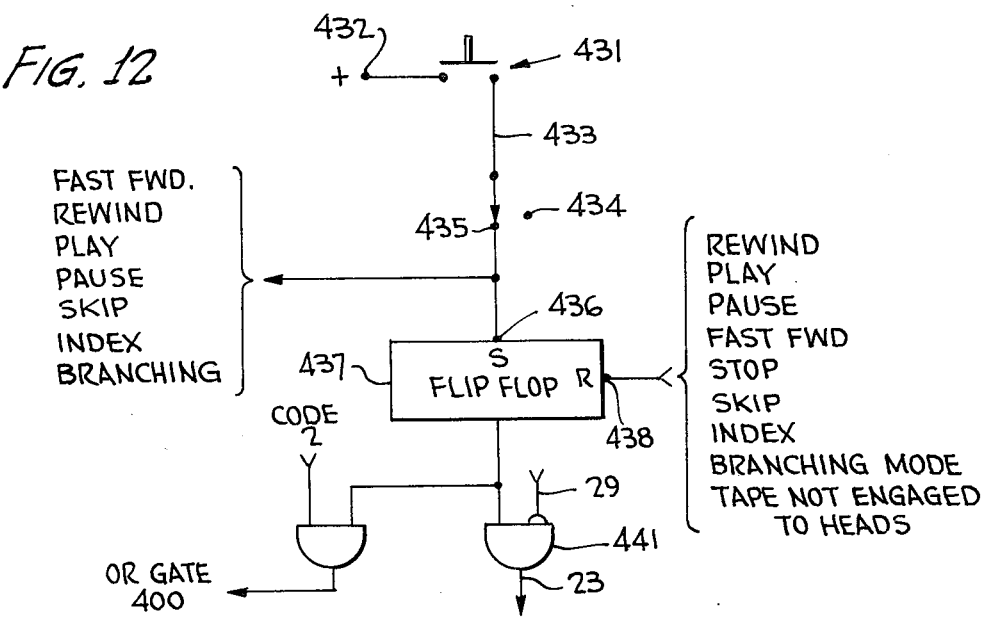
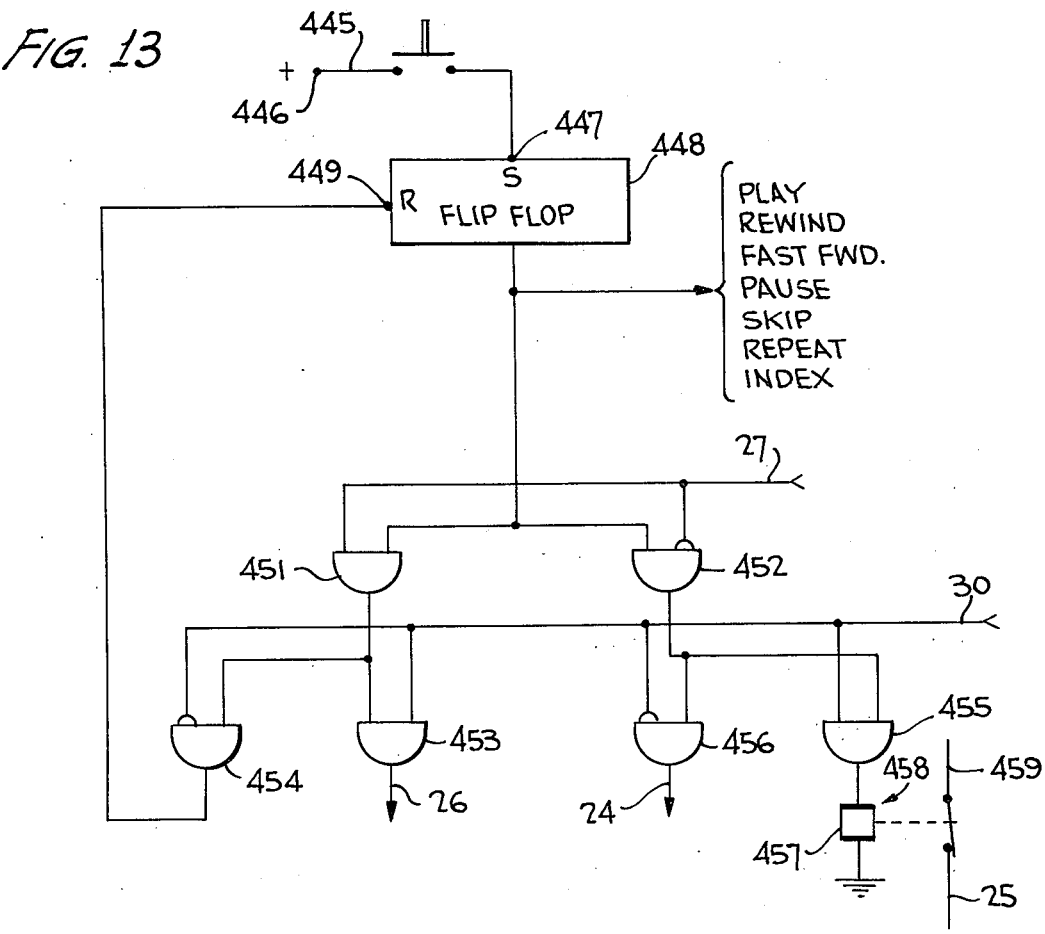

PROGRAMMED PRESENTATION SYSTEM

FIELD OF INVENTION

The present invention relates generally to systems for automatically supplying selected pertinent information to operators, and more particularly to a system wherein a dynamic storage medium having information stored thereon for presentation to the operator is selectively driven at a speed enabling the operator to be provided with the information or at higher speeds wherein the medium moves quickly in either direction and is stopped accurately at a location designated by the medium itself or at a specific location designated by the operator.

BACKGROUND OF THE INVENTION

Numerous systems have been designed and proposed for automatically presenting information to an operator, such systems are often employed for educational purposes to teach a student. Certain of these systems have employed combined audio and visual presentations that are selectively presented under the control of the student. However, the prior art systems have either generally been extremely complex, with considerable flexibility or relatively simple with little flexibility and limited utility. The complex systems have frequently employed a general purpose digital computer at a remote location or shared with a number of student or operator stations. Such systems, therefore, are restricted and not adaptable for use by an individual user at a remote location. While relatively uncomplicated systems have been devised with a fair degree of flexibility, these systems generally use storage mediums having unusual visual medium and track configurations, not readily available on a commercial basis and compatible with existing record playback systems.

BRIEF DESCRIPTION OF THE INVENTION

In accordance with the present invention, a new and improved programmed display system, particularly adaptable for educational and instructive purposes, is provided by utilizing a generally available dynamic storage medium, such as a video magnetic tape. The tape includes the usual audio and video information tracks, in the form of a longitudinal audio track for aural presentation, a longitudinal video control track and diagonal video tracks, as well as a program track which extends the length of the tape, parallel to the audio track used for the aural information. Such tapes and appropriate playback systems are available on a commercial basis.

The program track is provided with messages to indicate the position of the tape and to enable the tape to be advanced or returned to predetermined positions for branching on a selected basis in response to operator inputs to questions or situations presented to him by the aural or visual information. After a branching operation has been completed and in response to the operator activating a numerical input or clear control, the tape is automatically indexed to a designated location in the presentation medium.

The operator has the ability to index the tape to any desired location, in accordance with a directory with which he is provided, or to provide a temporary stop (pause) in the presentation of the material. The operator also may cause the tape to repeat segments of the most recently presented material relating to a particular subject, or to skip designated portions of the presented material.

To achieve the skip, repeat, indexing and branching operations and to reach the designated location in a minimum of time, the tape is selectively driven in the forward or reverse directions at speeds considerably in excess of the normal forward (play) speed and automatically pauses upon arrival at those locations. Also, the tape can be driven, at will, at high speed in either direction in response to commands from the operator.

The program track is also provided with special codes for enabling special control functions to be performed. The special codes are identified by signals having magnitudes which cannot represent tape locations and thereby can be ignored by electronic processing circuitry responsive to the indicia location code. The electronic circuitry responds to values of the special codes to automatically generate pauses at designated points in the audio-visual information; for example, at the completion of an information segment or to terminate a repeat or skip operation. A special code is also employed to enable the skip mode to be entered in response to commands by the operator.

As a further feature of the invention, inputs from the operator can be controlled so that they cannot initiate the skip, repeat, pause, index, fast forward or rewind modes of operation. Thereby, supervisory control can be provided if it is desired to force the user to proceed through the material in a disciplined manner. Supervisory control is also provided so that the tape automatically goes to either the play or pause mode upon the completion of a skip or repeat operations. Supervisory control can also be selectively provided to inhibit the play mode as an alternative in a branch selection process.

Because the tape can be driven at widely varying speeds, over at least a 10:1 speed ratio, the detection of tape location information from the program track presents certain problems, relating, for example, to the variable frequency of the program track signals, tape jitter (f.m.), and frequency response of pick-up heads and playback circuits. In addition, to enable the system to be utilized with commercially available systems, only one program track can be employed.

As a result of these limitations, the program track utilizes a trilevel, audio carrier envelope. Binary bits which provide the data on the program track are represented by envelopes having zero and a predetermined, maximum envelope, while clock pulses, associated with each binary bit, are represented by an envelope having an amplitude one-half of that of the predetermined maximum. Detection of the envelope amplitude is provided by a network including threshold detectors and retriggerable one shot multivibrators, which preclude response time problems of conventional audio detectors employing low pass filters and rectifiers.

It is, accordingly, an object of the present invention to provide a new and improved programmed information presentation system.

Another object of the invention is to provide a new and improved integral programmed information system employing a conventional dynamic recording medium, which system is particularly adapted for educational and instructional purposes, and provides mobility and great flexibility of utilization.

A further object of the invention is to provide a new and improved programmed, information presentation system wherein an operator can, at will, cause pauses in the presentation or can cause certain portions of the information to be repeated or skipped, or can cause a certain portion of the information to be reached (indexed) at will.

A further object of the invention is to provide a new and improved programmed, information presentation system wherein complex branching is performed in a relatively simple machine utilizing a conventional dynamic storage medium that carries instructions for alternative branching operations.

An additional object of the invention is to provide a new and improved programmed information system wherein branching is performed in response to alternative inputs from an operator and wherein an automatic feature is provided to allow return to the branch selection point if an incorrect branching operation is recognized by the operator.

Another object of the invention is to provide a new and improved programmed information presentation system wherein operator input functions can be inhibited from a supervisory station for disciplined applications.

An additional object of the present invention is to provide a new and improved system for deriving binary signals from a magnetic tape track capable of being driven at widely variable speeds.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 6 is a schematic diagram of an audio demodulator included in the electronics network of FIG. 5;

FIGS. 7A–7E are waveform illustrations in the FIG. 6 demodulator; and

FIGS. 8–15 are schematic diagrams of logic circuits for respectively performing the play, index, skip, pause, repeat, stop, fast forward, and rewind operations.

DETAILED DESCRIPTION OF THE DRAWING

Figure 1:
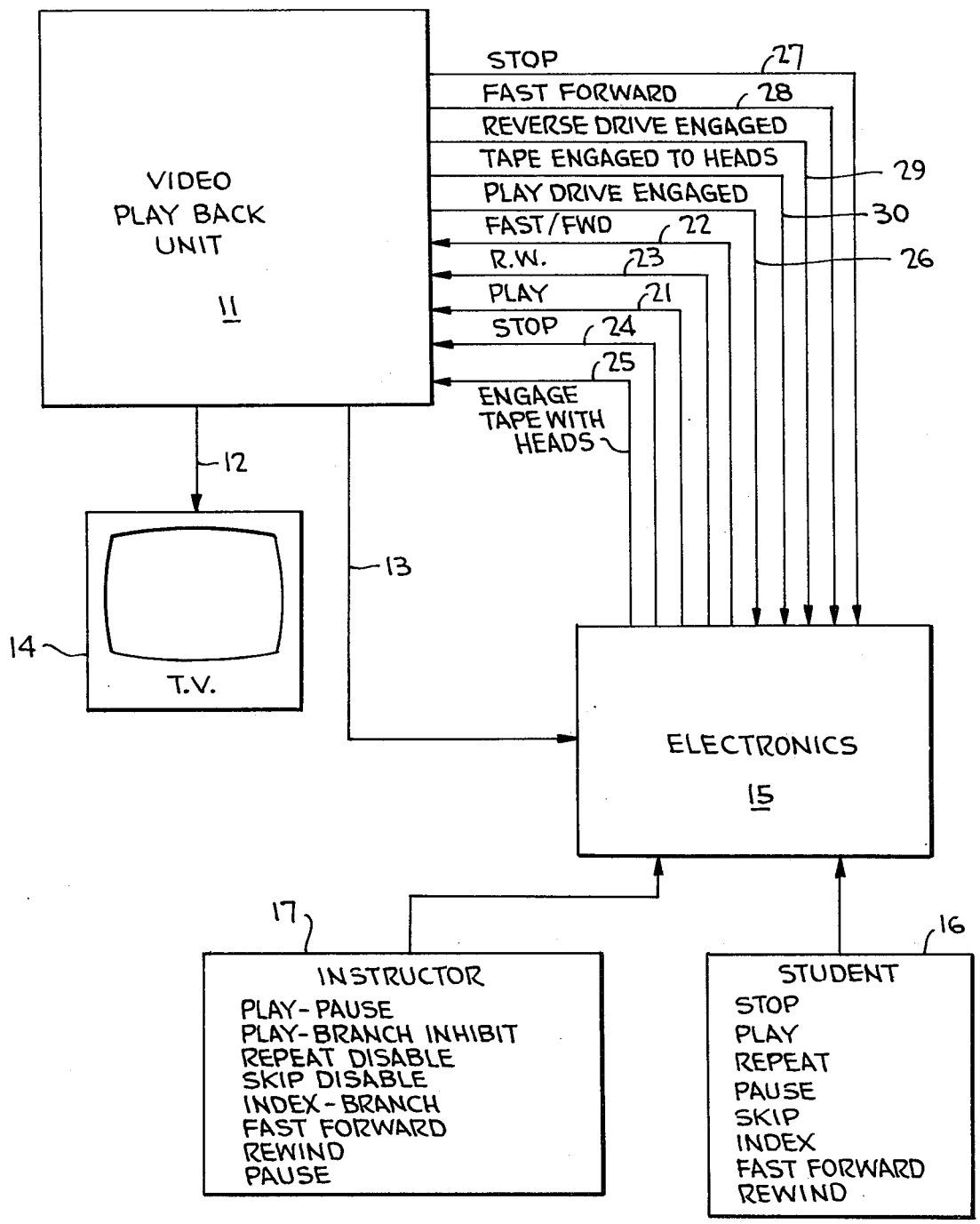
FIG. 1 is an overall block diagram of a preferred embodiment of the present invention.

Reference is now made to FIG. 1 of the drawing wherein there is illustrated in block diagram form the overall organization of a system in accordance with the present invention. The system includes a video, magnetic playback unit 11 for deriving a composite video and audio output signal on lead 12 and an audio output on lead 13. The composite audio-video signal on lead 12 has a format corresponding with a conventional television format, as prescribed for example by U.S. standards. The video magnetic playback unit 11, therefore, is of conventional design and is preferably of a type responsive to a dynamic storage medium, preferably a magnetic tape of a video tape cartridge or cassette. Such cartridge or cassette playback units generally include one or more rotating magnetic playback heads, a pair of stationary audio playback heads, employed to derive audio information corresponding with the video information and a head employed for video head to video tape positioning. The composite signal derived from one of the stationary audio heads and the rotating magnetic heads is supplied via closed circuit television lead 12 to a conventional television receiver 14 which provides aural and visual signals to an operator, who is preferably a student or technician being taught particular instructional material. Frequently, the instructional material relates to procedures to repair a particular type of equipment, such as a radio receiver. In certain instances, the video portion of the playback unit can be eliminated and an acoustic output device can be substituted for the television receiver.

The other audio track on the tape of playback unit 11 supplies lead 13 with a signal indicative of the relative location of the tape and the playback heads, as well as other information relating to the content of the signal supplied to lead 12 and instructions for enabling certain segments of the information supplied to lead 12 to be derived in appropriate sequence. The audio signal on lead 13 is supplied to an electronics network 15 that is also responsive to signals derived from an operator (student) station 16, as well as to signals from a supervisory (instructor) station 17. Student station 16 includes a matrix of manually operated keys, ten of which are used to supply numerical information to network 15, while the remaining nine keys supply function signals to the electronics network to control the movement of the tape of playback unit 11. Instructor station 17 includes several input switches to selectively enable certain of the command functions which can be supplied to the electronics network 15 from station 16.

In response to the signals from audio source 13 and the student and instructor stations 16 and 17, electronics network 15 derives signals on leads 21–25 to control the movement of the tape of playback unit 11. In particular, network 15 supplies binary signals to playback unit 11 on leads 21, 22, 23 and 24 to enable the playback unit to be driven in a forward direction at normal speed (play), to advance the tape at a fast speed (typically ten to thirty times the normal, play speed of 3.75 inches per second), to rewind the tape at a relatively fast speed, and to stop the tape. A further binary signal is supplied by electronics network 15 to tape playback unit 11 on lead 25 to cause the tape and the playback heads to be urged into engagement with each other. Magnetic playback unit 11 is provided with motors and tape engaging actuators, as well as circuitry for enabling the motors and tape engaging actuators to be automatically driven in response to command signals from the electronics network 15, as derived on leads 21–25.

To provide signals indicative of the manner in which the magnetic tape of unit 11 is being driven, and whether the tape is in engagement with the playback heads, the playback unit is provided with appropriate signal sources which derive binary signals on leads 26–30, whereby binary one levels are derived on leads 26–30 in response to: (a) the tape being driven forward at the normal speed (play drive engage), (b) the tape being stopped, (c) the tape being driven in the forward direction at high speed, (d) the tape being driven in the reverse direction (always at high speed), and (e) the tape being in engagement with the audio and video heads of the playback unit. The signals on leads 26–30 are supplied to electronics network 15 and, together with the signals from sources 16 and 17 and the audio signal on lead 13, control the derivation of the binary signal levels on leads 21–25 to control the tape movement and engagement with the pickup heads.

Figure 2:
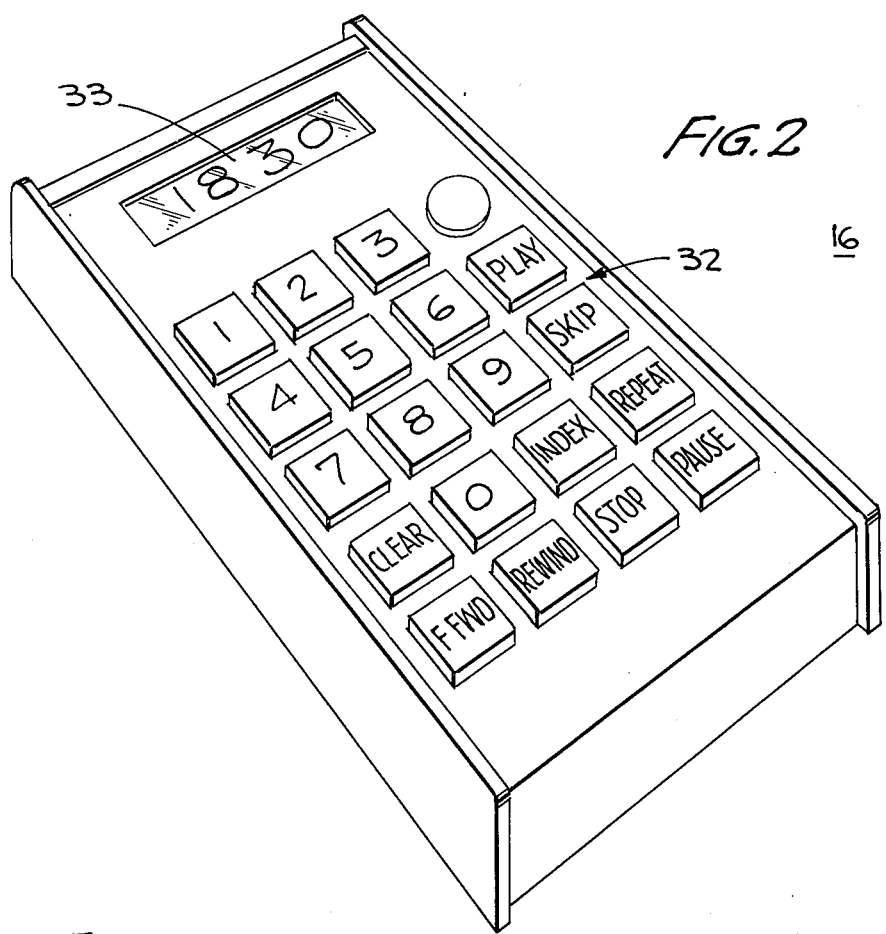
FIG. 2 is an illustration of an operator station for use in conjunction with the system of FIG. 1.

As illustrated in FIG. 2, the operator station 16 is preferably a hand-held unit, approximately the size of a modern hand-held electronic calculator. Station 16 is provided with a keyboard matrix 32 of nineteen keys, ten of which are provided for the numerals 0–9. Numerals 0–9 enable the operator to supply command signals to electronics network 15 for indexing or branching to a particular location of the tape on playback unit 11. The operator is provided with a directory that provides a correlation between certain locations on the magnetic tape and certain portions of the material in which he may be interested. To enable the operator to determine the number he has entered by depressing the 10 numeric indicating keys, station 16 is provided with a four-digit numerical display 33.

The remaining nine keys are for supplying instructional or command signals to electronics network 15 to enable the operator to selectively drive the tape in the forward direction at a fast speed, to rewind the tape, to stop the tape, to pause, i.e., temporarily stop the tape, to repeat a certain portion of the lesson or material on the tape, to skip certain portions of the tape, to drive the tape in the normal forward direction at a normal speed wherein the operator can obtain meaningful audio and visual information from television receiver 14, and to command entry of any selected four-digit location of the tape into the electronics network (index). The matrix 32 is also provided with a "clear" key to enable any prior entry which has been supplied to the keyboard to be cleared prior to execution of a new entry by the electronics network 15.

The tape of playback unit 11 is also capable of being selectively driven or branched to different locations depending upon the response of the operator. For example, for maintenance instruction or to provide repair instructions for equipment, the operator activates the clear or one or more of the numerical inputs (0–9) of keyboard 32 followed by the index key. If, for example, a radio receiver is being repaired by the operator the television receiver 14 advises the operator that one of several conditions may exist for a certain test situation. The receiver 14 also aurally indicates which one of the several numerical keys the operator should depress depending upon an observed test condition. In response to the depressed keys, the system automatically advances the tape to the specific portion containing instructional material as to how to repair the noted defect. If no defect is observed, the operator is instructed by the material presented by television receiver 14 to activate the play key of matrix 32 and the tape continues to advance in the play mode from its preceding series of instructions. By use of all of the keys on keyboard 32, the operator is selectively able to proceed through the audio visual material at his own speed, by repeating certain portions of the instructional material on the tape of playback unit 11, skipping certain portions, or going to any particular portion of the material as indicated by the directory.

To prevent the operator from taking certain actions which the supervisor feels are undesirable, instructor station 17 is provided with inputs which selectively disable certain commands from the student station. In particular, the instructor station 17 is provided with a total of eight input toggle switches, five of which provide for selectively disabling of: repeating, skipping, fast forward movement of the tape, rewinding of the tape, and pauses by the student or operator. In addition, the supervisory station 17 is provided with an "index-branch" toggle switch having an "index-branch" position and a "branch" position. In the "index-branch" state of the "index-branch" switch, manual indexing to the location indicated in the display 33 of station 16 or the branching alternative displayed in display 33 are possible. If the supervisory "index-branch" switch is activated to the "branch" state, manual indexing from keyboard 32 to a desired tape location is disabled. A further supervisory switch, entitled "play-branch inhibit", prevents entry of the play mode when in the "branch inhibit" position, whenever a branch selection operation is being performed. The remaining switch, entitled "play-pause" includes a play position, which when activated automatically initiates the play mode at the point of completion of skip or repeat operations, as identified in the program track for presentation of the new or repeated audio-visual material. The "play-pause" switch, when in the pause position, provides for an automatic pause upon the completion of a skip or repeat operation.

Figure 3:
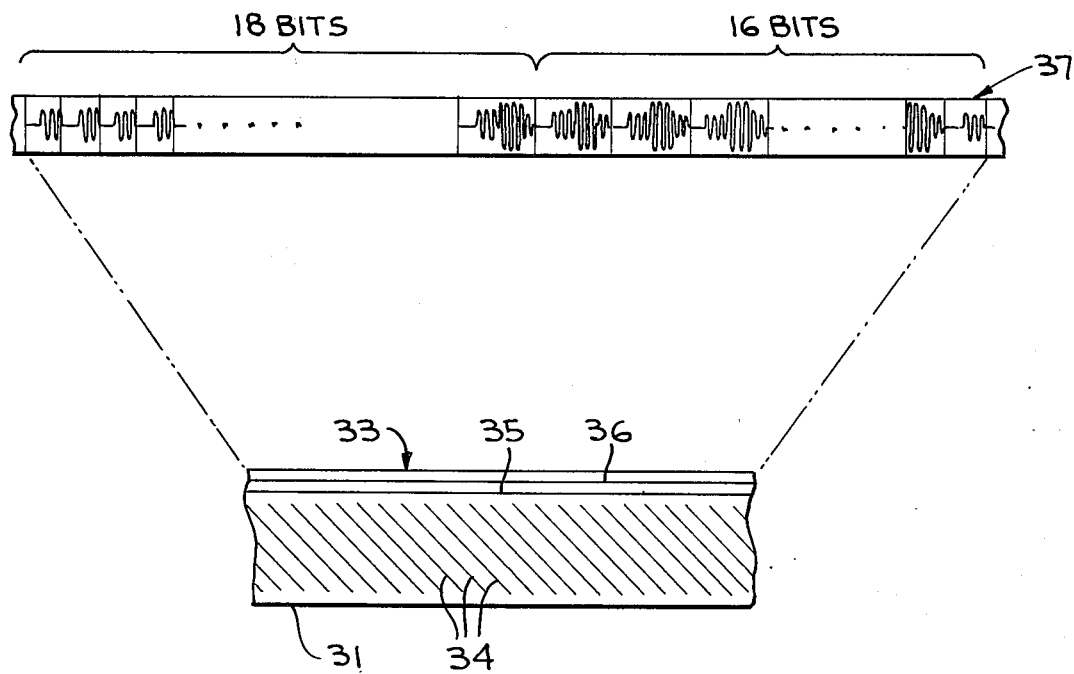
FIG. 3 is a schematic representation of a video magnetic tape employed in the system of FIG. 1.

Reference is now made to FIG. 3 of the drawing wherein there is illustrated in schematic form, a portion of the magnetic tape 33 which is employed in magnetic playback unit 11. Tape 33 is relatively wide, for example, one-half inch, and includes a multiplicity of parallel diagonal, video tracks 34, one of which is provided for each frame presented on the screen of television receiver 14. A skip field technique is preferably employed for recording and picking up the video tracks 34, whereby three rotating heads are included in the playback unit 11 to this end and, the length of tape 33 is generally one-third of that of, more conventional type tapes. It is to be understood, however, that conventional, non-skip field units or other types of mediums can be utilized to store the presented video information.

On one side of the video tracks 34, first and second parallel audio tracks 35 and 36 are provided. Tracks 35 and 36 are positioned to provide corresponding information for the video track 34, with track 35 providing sound information to the television receiver 14. Audio track 36, however, provides the longitudinal position of the audio and video information of tracks 34 and 35 from the beginning of the tape, in addition to other command codes. At the normal play speed of tape 33 the information recorded in track 36 represents time, as measured in seconds, from the beginning of the tape. Thereby, for each second of the normal movement of tape 33 through the playback unit 11, a different time indication is derived from track 36 and supplied to electronics network 15 by a lead 13, except for time slots requiring other codes, in which case time indication is omitted.

A preferred format for each second, i.e., word, of track 36 is illustrated in enlarged form on FIG. 3, by the rectangle 37 removed from the remainder of the tape. As seen in rectangle 37, one second of track 36 includes 34 sequential binary bits. Each bit includes a data segment followed by an equal length clock segment. The data segments are recorded as a variable amplitude audio carrier wave having an envelope of predetermined maximum magnitude or zero magnitude, respectively, representing binary one and zero values. The clock portion of each bit is a carrier having an envelope midway between the maximum envelope of the binary one value and the zero envelope of the binary zero value. For the normal tape speed, each data bit portion and each clock bit portion include five cycles of a 340 Hertz carrier. Of course, as the magnetic playback unit is being driven at a high speed, either in the fast forward or reverse modes, the frequency of the audio carrier supplied to lead 13 increases, usually to in excess of ten times the normal frequency. Since a quantized, amplitude modulation pulse system is employed, rather than more conventional types of coding, detection of the coded data on track 36 is obtained despite tape jitter and the variable tape speed. The audio modulation system is also desirable because existing record-playback circuits can be employed and the normal audio response of conventional audio heads at the variable tape speeds employed are compatible with the carrier frequency, even at the high speed. Because only one audio track is available for coding on some commercially available playback units, parallel track approaches are not as feasible as the single program track employed herein.

Each one second word recorded on track 36 includes eighteen longitudinally spaced bits which identify whether the sixteen following, longitudinally spaced bits represents the indicia word location along the tape or a location to which the tape is to be driven for branching. The first eighteen bits of each word, frequently referred to herein as an address, contain binary one levels at the first and eighteenth positions and a zero at the remaining sixteen bit positions if the following sixteen bits of the word represent the indicia word location on the tape or if the following sixteen bits represent special control functions, such as automatic pauses or skip enable signals. In contrast, the last sixteen bits of a word represent a branching location on the tape 33 if the first seventeen bits of the word are zeros and the eighteenth bit is a binary one.

Regardless of whether the last sixteen bits of a word contain information used for tape location, special control functions, or branching, these bits are arranged as a four decade binary coded signal, with each decade containing four bits. Each binary coded decade contains the numbers zero through nine or fifteen, in accordance with the usual representation. Numbers 0 through 9 are used exclusively for location information. If a number 15 is present in one or more of the binary coded decimal decades, the indicia location information used for manual indexing or branching is inhibited and special control function indicated by the last sixteen bits of the word can be performed. In the particularly described embodiment of the invention, five of the possible sixteen special control functions have been implemented as follows:

TABLE

| Special Codes | Function |
| --- | --- |
| 1 | Generates automatic pause from play mode (Play - Pause, non-secure) |
| 2 | Generates automatic pause or play from repeat mode (Repeat - Play/pause) |
| 3 | Generates enable for skip mode |
| 4 | Generates automatic pause or play from skip mode (Skip - Play/pause) |
| 5 | Generates automatic pause from play mode (Play - Pause, secure) |

It is to be understood that the remaining eleven possible special control functions can be used for other program operation commands or for switching or control of external equipment with appropriate interface circuitry, as desired for any particular situation.

To inhibit detection of the last sixteen bits of the last branch word during the rewind operation, a dummy address of all ones for the first eighteen bits is provided in the next indicia word on the tape. The message portion of this word is the same as in a normal word and thereby includes sixteen sequential bits indicating a location indicia.

Consideration is now given to the manner in which a conventional, generally available commercial magnetic playback unit is modified to enable the playback unit to be responsive to the signals on leads 21-25 and to derive the signals on leads 26-30. Generally, the magnetic playback unit 11 is modified to motorize functions normally performed in response to manual activation of certain manual input controllers. The playback unit is also provided with switches to sense certain conditions within the playback unit to enable the signals on leads 26-30 to be derived.

Figure 4:
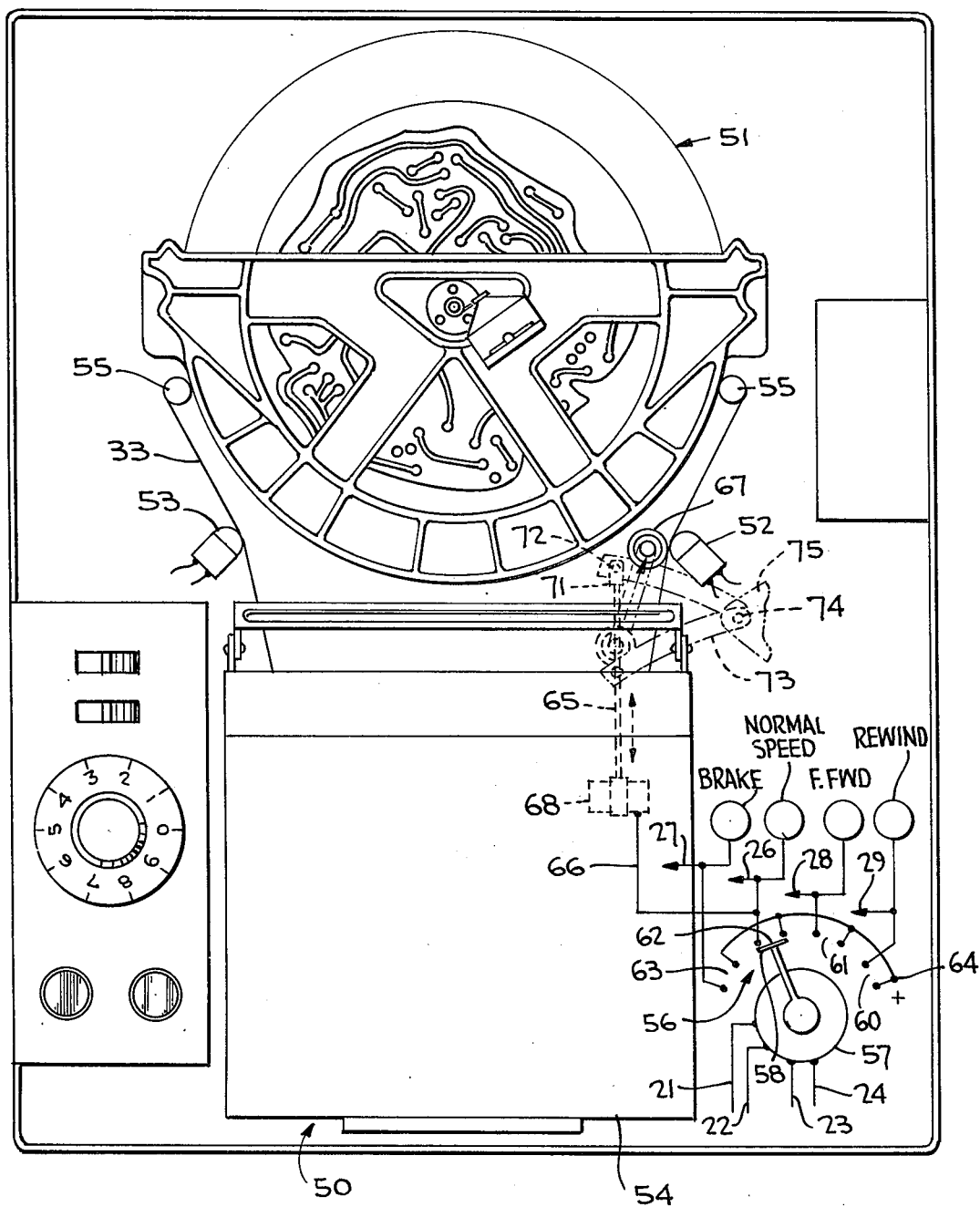
FIG. 4 is a front view of a tape playback unit, with modifications incorporated in accordance with certain aspects of the present invention.

The modifications provided for magnetic playback unit 11 are described in conjunction with a unit commercially available from Cartridge Television, Inc., as described in a publication entitled "OEM Service Manual - Video Tape Recorder" (Model CT 1), having an effective date of July 15, 1972. As seen from FIG. 4 herein, the magnetic playback unit broadly includes a scanner disc assembly 51 which includes the three rotating video magnetic pickup heads (not shown), stationary audio pickup heads 52 and erase head 53. Magnetic tape 33 is supplied to one-third of the arcuate perimeter of circular assembly 51, over the lower portion of the assembly, and past pickup heads 52 and 53 from cartridge 54 which is located in a bucket assembly 50 at the bottom of the unit. Magnetic tape 33 is selectively withdrawn from cartridge 54 into engagement with the peripheral surface of scanner disc assembly 51 in response to upward translation of arms (not shown) having inlet and outlet cone and drag link assemblies 55 attached to their ends. To sense assemblies 55 urging the tape into contact with the playback heads, the commercial unit includes a leaf spring switch (not shown) which is closed in response to engagement between the heads and tape. In response to the leaf spring being closed, a positive d.c. binary one voltage level is applied to lead 30.

To motorize the manual operations of play (i.e., normal forward speed stop, fast forward and rewind) a rotary switch 56, driven by stepper motor 57 in an arcuate path is provided. Motor 57 includes four input terminals that are connected to leads 21-24 and to different coils whereby the switch 56 is driven to one of four positions dependent upon which one of leads 21-24 is supplied with a binary one level. The motor is locked in situ after a binary one level has been removed from the lead 21-24 until a binary one level is supplied to a different one of the leads 21-24, at which time the motor is appropriately driven. Switch 56 includes a bridging contact 58 which selectively engages contact pairs 60, 61, 62 and 63 arcuately located around the rotary path of contact 58. One contact of each of contact pairs 60–63 is permanently connected to a positive d.c. source at terminal 64. Second contacts of each of contact pairs 60–62 are selectively connected to a motor (not shown) of unit 11 for driving the magnetic tape at high speed in the reverse direction, at high speed in the forward direction or, at normal speed in the forward direction. The other contact of contact pair 63 is connected to a solenoid which applies a breaking force to the drive shaft of the motor for driving the magnetic tape. The second contacts of contact pair 60–63 are also respectively connected to output leads 29, 28, 26, and 27 to provide binary signals indicative of the nature of the magnetic tape movement, also the second contact of contact pair 62 is connected to lead 66 which energizes solenoid 68. A drive rod 65 is provided for selectively energizing pinch roller 67. Drive rod 65 is energized by solenoid 68. In response to solenoid 68 being energized, pinch roller 67 is activated to cause capstan drive of the magnetic tape. To this end, one end of drive rod 65 is connected to a drive translator 71 that is fixedly connected to point 72. Drive translator 71 engages cam 73 which is pivoted about point 74 and held in situ by fixed bracket 75. Cam 73 selectively engages a tie rod and ball joint assembly that is attached to pinch roller 67 to cause engagement of the tape by the pinch roller. The operator can remove a partially played tape and reinsert it into the playback unit 11 at a later time without losing the indexing functions and without requiring a tape rewind to zero.

To enable the tape to be selectively brought into and out of engagement with the periphery of scanner disc assembly 51, at will regardless of the position of the tape and the cartridge so that the tape cartridge or cassette can be removed from unit 11 anywhere along the tape length, a solenoid (not shown) energized by the signal on lead 25 initiates the normal mechanical drive for tape engagement to the heads.

Figure 5A:
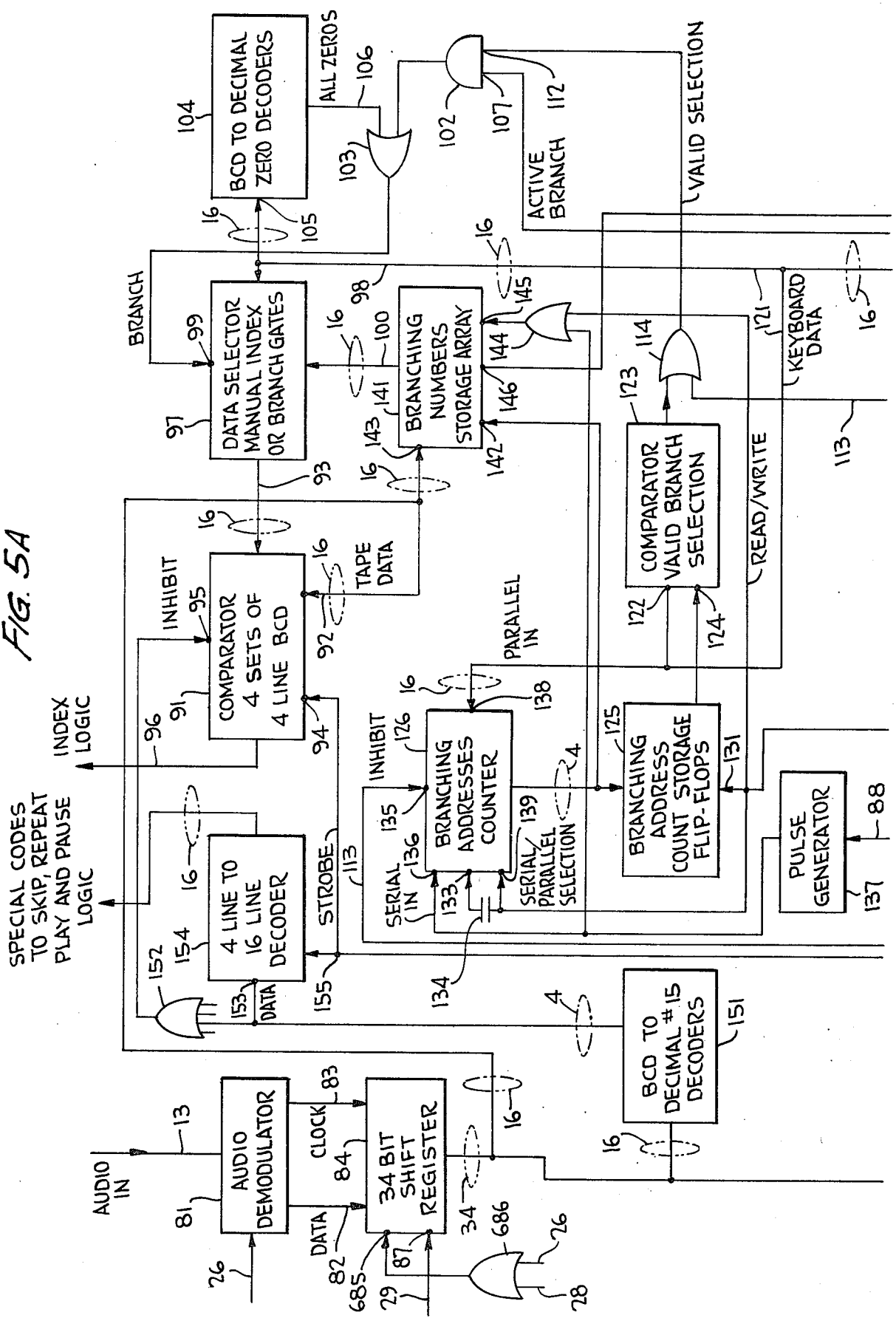
FIGS. 5A–5B is a block diagram of a portion of the electronics network included in the system of FIG. 1.
Figure 5B:
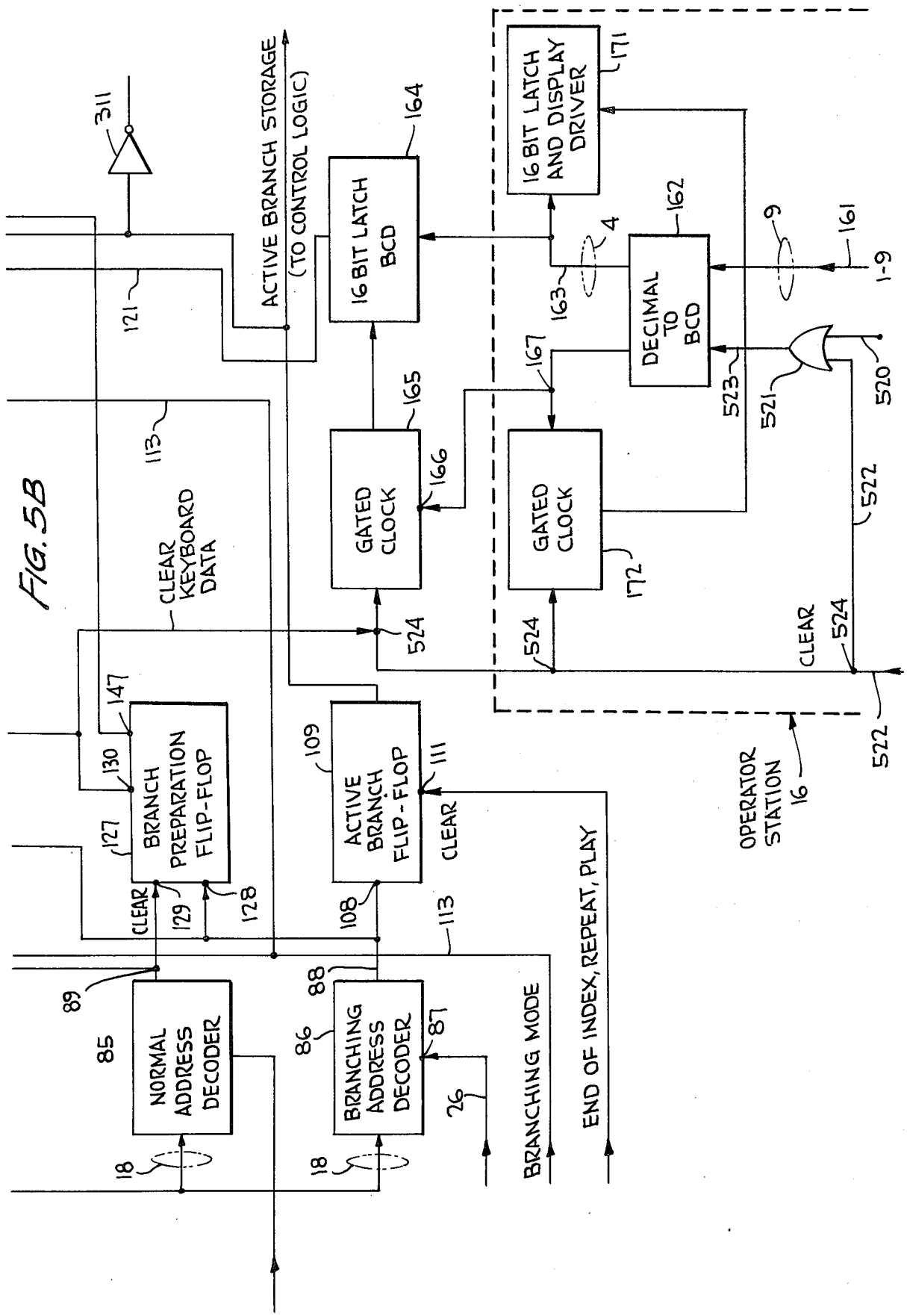

Reference is now made to FIGS. 5A and B of the drawing wherein there is illustrated a block diagram of a portion of the apparatus included in electronics network 15. Basically, FIG. 5 is directed to the portion of the electronics network which decodes the audio signal on lead 13; recognizes the existence of a "normal" or branching address code, and performs the branching and indexing functions in response to the audio signal. Control for the elements included in FIG. 5 is provided by logic circuits described infra, which circuits are responsive to the signals on leads 26–30 and from the student and instructor stations 16 and 17.

Reference is now made more specifically to FIG. 5 wherein an audio demodulator 81 is responsive to the audio signal on lead 13 and a speed indicating signal on lead 26. In response to the audio signal and the speed indicating signal, audio demodulator 81 derives a serial non-return to zero binary signal on lead 82 and a series of clock pulses on lead 83. One clock pulse is derived on lead 83 for each binary bit of the signal on lead 13. Transitions of the binary signal on lead 82 are coincident with the beginning and end of a full bit of the audio signal on lead 13, i.e., the leading edge of each binary bit on lead 82 is synchronized with the beginning of the data portion of each bit of the audio signal, while the trailing edge of each binary bit on lead 82 is synchronized with the trailing edge of the clock portion of selected audio signal binary bits. Demodulator 81 is responsive to the speed indicating signal to effectively change the response time of circuitry included in the demodulator and enable accurate signals to be derived on leads 82 and 83 over the ten to one or more speed ratio of the tape movement through playback unit 11.

The data and clock signals on leads 82 and 83 are supplied to data and clock input terminals of 34 bit shift register 84 that is selectively shifted right or left depending upon the direction of the movement of the magnetic tape in playback unit 11. In response to forward movement of the tape, a binary one signal is supplied to lead 26 or 28 and a binary one signal is supplied to right shift input terminal 685 of shift register 84 through OR gate 686. In response to the tape being driven in the reverse directions, a binary one signal is supplied by lead 29 to the left shift input terminal 87 of shift register 84. The data bits on lead 82 are therefore shifted to the right or left in response to clock pulses on lead 83, depending upon whether a binary one is supplied to terminals 685 or 87. Shift register 84 includes thirty-four separate output leads on which are simultaneously derived binary signals indicative of the states of the thirty-four different stages of the shift register.

To determine whether a particular word loaded in register 84 is a normal instruction or a branching instruction, binary signals from the first eighteen stages of the shift register are fed in parallel to normal and branching address decoders 85 and 86. Decoders 85 and 86 include eighteen decoding stages for recognizing the normal address of a one in the first and eighteenth stages of register 84 with sixteen zeros in the stages 2–17 and for recognizing the pattern of zeros in stages 1–17 of register 84 followed by a one in stage 18. Conventional decoder circuitry, in the form of inverting and AND gates is provided in the two decoders 85 and 86 to achieve these ends. Decoder 86 includes an enable input terminal 87 which is responsive to the signal on lead 26 to indicate that the tape is being driven forward at the normal, play speed whereby decoder 86 is responsive to the outputs of shift register 84 only while the tape is being driven forward at the normal playback speed. Decoders 85 and 86 respectively include leads 89 and 88 on which are derived binary signals indicative of whether a normal or branching address is stored in shift register 84. Thereby, during normal play operation, a binary one signal is derived on one of leads 88 or 89 for one bit period of each word, after the word has been fully loaded into shift register 84. When a word is fully loaded in shift register 84, stages 19–34 of the register are loaded with the sixteen bit message portion of the word.

As indicated supra, the binary values in stages 19–34 of shift register 84 indicate the location of the tape relative to the pickup heads at the time when normal address decoder 85 derives a binary one signal on lead 89. The address indicating signal derived from stages 19–34 of shift register 84 is compared with a tape desired location, four decade, binary coded decimal signal in comparator 91, which signals are respectively supplied to leads 92 and 93 and thence to input terminals of the comparator. Comparator 91 also includes an enable input terminal 94 responsive to a binary output of normal address decoder 85, as well as an inhibit input terminal 95, discussed infra. Comparator 91, when enabled, derives an output signal on one of three leads 96 to indicate whether the magnitude of the signal on lead 92 is equal to, greater than, or less than the magnitude of the signal on lead 93. Logic circuitry, discussed infra, responds to the signal on lead 96 to cause the tape to be stopped, driven in the forward direction, or driven in the reversed direction, depending upon the relative magnitude of the signals supplied to comparator 91.

The signal supplied to lead 93 is selectively supplied by information provided to the network of FIG. 5 from the numerical keys of keyboard 32 or from an address message derived from magnetic tape track 36. The sixteen bit binary coded decimal signal supplied to lead 93 is derived from sixteen selector gates 97, one of which is provided for each of the sixteen bits. Gates 97 normally respond to a signal on leads 98 indicative of a manually entered index code for a desired location of the tape. However, in response to a binary one signal being supplied to input terminal 99, gates 97 are activated so that a sixteen bit, binary coded decimal signal on leads 100, indicative of a desired branching location, are supplied to leads 93 to the exclusion of the bits on leads 98.

The determination that a branch location is to be selected by gate 97 is performed by detecting a keyboard entry of all zeros or by determining that an active branch has been established from track 36 and the operator has made a valid branch selection. To these ends, there is provided a network including AND gate 102, which derives a binary one signal in response to an active branch being validly selected, and OR gate 103, which is responsive to the output of AND gate 102 and a binary signal indicative of the manual keyboard 102 and a binary signal indicative of the manual keyboard being in a clear position. OR gate 103 supplies a binary one signal to input terminal 99 of gate 97. A binary one signal is supplied to OR gate 103 in response to the manual keyboard being cleared by providing binary coded decimal to zero decoder 104. Decoder 104 is responsive to a sixteen bit, four decade binary coded decimal signal supplied to its input terminals 105, and ultimately derived in response to the manual keyboard entry. In response to the signal applied to terminals 105 indicating that the manual entry is equal to zero, i.e., the value in each of the four decades of the binary coded decimal signal all being equal to zero, the decoder derives a binary one output signal on lead 106 that is passed through OR gate 103 to input terminal 99 of gates 97.

An indication that track 36 has provided a branching instruction into the electronics network is provided by supplying a binary one signal to input terminal 107 of AND gate 102. To this end, output lead 88 of branching address decoder 86 is connected to set input terminal 108 of flip-flop 109, which is thereby activated to the set state. Flip-flop 109 remains in the set state until it is cleared (reset) in response to a signal being supplied to its reset input terminal 111. The reset input is supplied to terminal 111 from logic circuitry described infra, in response to an indication being derived that indexing of the tape has been completed or that a repeat or play mode has been initiated. Thereby, a binary one signal is derived from flip-flop 109 during the entire time that the branching operation is active, and this binary one signal is fed to terminal 107 of AND gate 102.

To provide an indication that the branch has been properly or validly selected, a binary one signal is supplied to input terminal 112 of AND gate 102. A binary one signal can be supplied to terminal 112 directly from logic circuitry associated with the index function, in response to the logic circuitry supplying a binary one signal to lead 113 to indicate that a branch is being performed. The signal on lead 113 is supplied to terminal 112 of AND gate 102 via OR gate 114.

Another determination that a valid branch has been selected is made by comparing a keyboard numerical entry with the number of branches which have been read from the magnetic tape in sequence. Typically, the magnetic tape is arranged so that after a certain portion of the normal sequential audio-video material, two or more branching words are presented in sequence and additional normal material is thereafter presented. In such situations wherein the operator is presented with alternative branch choices, numerical inputs from keyboard 32 which are of greater magnitude than valid branch alternatives are ignored. To enable the tape to get to the correct branching location, it is necessary, therefore, to count the branching addresses. The operator selects one of the multiple choices by activating one of the keys that represent the numbers from one to nine. Thereby, a sixteen bit, four decade binary coded decimal signal derived on lead 121 includes zeros in the three most significant decades, and a value from one to nine in the least significant decade when the operator has responded to a situation or question presented to him by the audio or visual information on tracks 35 or 34.

The sixteen bit signal on lead 21 is supplied to one set of input terminals 122 of comparator 123. Comparator 123 includes a further set of input terminals 124 responsive to a four bit binary signal indicative of the number of branching addresses which have been read from track 36 in sequence, as derived from four flip-flops 125 that store a count for the number of branch words read in sequence while the system has been in the branching mode. Comparator 123 includes internal circuitry for comparing the bits of the three most significant decades of the signal on leads 121 with binary zero values. The least significant decade of the signal on lead 121 is compared with the branching address signal stored in flip-flops 125, in the remaining circuitry of comparator 123. In response to the three most significant decades of the signal on leads 121 being equal to zero and the signal in the least significant decade of the signal on leads 121 being equal to or less than the branching address stored in flip-flops 125, comparator 123 derives a binary one output to signify a valid branching selection. The output of comparator 123 is supplied through OR gate 114 to terminal 112 of AND gate 102 to enable actuation of gates 97 as described supra.

To enable flip-flops 125 to be loaded with an indication of the number of branching words read from tape 33 during the considered branching operation, branching addresses counter 126 and branch preparation flip-flop 127 are provided. Branch preparation flip-flop 127 includes set and reset input terminals 128 and 129 respectively responsive to the binary one signals derived from the outputs of branching address and normal address decoders 86 and 85. Thereby, flip-flop 127 is activated to the set stage throughout a period while branching addresses are being consecutively read from track 36. Branch preparation flip-flop 127 includes an output terminal 130 which supplies a binary one signal to an enable input terminal 131 of the four flip-flops 125. Only while flip-flops 125 are enabled in response to flip-flop 127 being activated to the set state, can flip-flops 125 respond to the branching number signal derived from counter 126.

Counter 126 includes four flip-flop stages which are selectively interconnected to function as a serial binary counter having a count sequence from zero to fifteen or as four parallel register stages. To control whether counter 126 functions as a serial counter or parallel register, the counter is provided with an input terminal 139 that is d.c. coupled to output terminal 130 of branch preparation flip-flop 127. In response to the leading edge of the output of branch preparation flip-flop 127, which is derived when the flip-flop is activated to the set state in response to a binary one from decoder 86, a relatively short duration pulse is a.c. coupled through capacitor 134 to terminal 133 to clear counter 126, whereby the counter is enabled in the serial mode while flip-flop 127 is activated to the set state. Counter 126 includes an inhibit input terminal 135 responsive to the binary, branching mode input signals supplied to lead 113 from the index logic network described infra.

To count the number of branching addresses read from track 36 during the branching operation being considered, counter 126 is provided with a serial input terminal 136 that is responsive to the trailing edges of pulses derived from pulse generator 137. Pulse generator 137 includes an input terminal responsive to the binary one output of decoder 86 on lead 88. Thereby, in response to branching address decoder 86 being activated to the binary one state, pulse generator 137 derives a relatively short duration pulse (compared to the lengths of the clock and data pulses), such as 10 microseconds, and the trailing edge of this pulse causes counter 126 to be advanced. As indicated supra, the branching count stored in counter 126 is supplied to flip-flops 125 and thence is compared with the four least significant bits of the binary coded decimal signal on lead 121.

Counter 126 is activated so that it functions as a parallel register in response to a binary zero being derived from flip-flop 127 and, at that time the four least significant bits, comprising the lowest order decade of the signal on lead 121, are supplied in parallel to the four stages of the counter via terminals 138. The four least significant bits of the manual entry from station 16, on lead 121, are supplied to counter 126 and subsequently are supplied to line 142 of storage array 141 for the selection of the appropriate stored word. A special branching operation, valid at all times, is initiated in response to the operator activating the clear key of matrix 32 followed by activation of the index key on the matrix. Thereby, the four bits of the least significant decade of the signal on lead 121 have binary zero values which provide an input on lead 142 of array 141. Array 141 derives the signal applied to lead 100 and that is indicative of the first branching location word stored. The first branching word stored normally provides automatic return to the portion of tape 33 immediately preceding the previous branching operation and the operator is able to return to the previous branch decision point if he has made an error in branch selection.

To derive the signal applied to lead 100 that is indicative of a branching location in response to the last sixteen bits of a word on track 36 of tape 33, a flip-flop storage array 141 is provided. Array 141 includes ten words, each having a sixteen bit message. One of the words is selectively read from array 141 to leads 100 and thence to input data selector gate 97. One sixteen bit word is selectively written into and read from storage array 141 at a time. Selection of the flip-flops in the array into which data are written and read from is made in response to the magnitude of a four-bit binary signal applied to terminal 142 of array 141 from the output of branching address counter 126. Thereby, the value of the signal applied to terminal 142 is an indication of the number of the branching address in a particular branching sequence; as indicated supra, this number may extend from zero to nine. Binary coded decimal signals from the branching address word indicative of the location on the tape where the branching begins is derived from track 36, and supplied to the designated word of storage array 141 by connecting stages 19-34 of shift register 84 to sixteen input terminals 143 of array 141. Terminals 143 are connected in parallel to the flip-flops comprising the ten words of array 141. The selection of the flip-flops in array 141 to be enabled in response to the signals at terminals 143 is determined by the number indicated by the signal supplied to terminal 142. To write the information on terminals 143 into the flip-flops of the designated word of array 141, the output of pulse generator 137 is combined with the set output of flip-flop 127 at terminal 130 in AND gate 144, the input of which is supplied to terminal 145. AND gate 144 is responsive to the leading edge of the output of pulse generator 137, whereby the designated flip-flips of array 141 are enabled to be responsive to the tape data indicating signal on terminal 143 simultaneously with the branching address decoder 86 recognizing the existence of a branching code. To control selective reading from the flip-flops of array 141, the array includes an input terminal 146 that is responsive to a reset output terminal 147 of flip-flop 127.

In response to flip-flop 127 being activated to the set state, to indicate that a branching word is being processed, array 141 is enabled so that it is responsive to the tape location signal supplied to terminal 143; however, if a branching operation is not being prepared, flip-flop 127 is activated to the reset stage and the voltage supplied to the terminal 146 causes the flip-flops associated with the designated word of array 141 to be read out to leads 100. Thereby, if a branch has been read from track 36, data selector 97 supplies to leads 93 a signal indicative of the address of the branching word that the tape is to be driven forward at high speed. The tape is driven to the designated location until that location is reached, as determined by comparator 91.

To control the special functions, discussed supra with regard to the Table, decoder 151 is provided. Decoder 151 is connected to be responsive to the four decade, sixteen bit signal derived from stages 19-34 of shift register 84. A special code is indicated by this signal if the binary coded value of any decade equals 15, i.e., if the four bits of any of the four decades all have a binary one value. Each decade is thereby susceptible to having the binary values zero through nine and fifteen.

Decoder 151 includes four separate decoders, one of which is responsive to each decade of the binary coded decimal signal derived from stages 19-34 of shift register 84. Each of the decoders of network 151 derives a binary one output in response to its input signal having a value of 15. For all other values of the input to each decoder, a binary zero is derived. If a binary one signal is derived on any one of the four output leads of decoders 151, an indication is provided that a special code has been detected and an input signal is supplied to inhibit terminal 95 of comparator 91. To these ends, the four output leads of decoders 151 are connected to OR gate 152, having an output connected to terminal 95.

To provide a designation of the number of the special code, the four decades of the message portion of the special code words are arranged to represent the numbers one through fifteen to provide a maximum of fifteen special codes. Thereby, the four output leads of decoders 151 carry binary levels indicative of the number of the special code. The four leads feed binary coded special code information into data input terminal 153 of decoder 154. Decoder 154 is provided with fifteen output leads, one for each of the possible values of the binary coded signal supplied to terminal 153. A different one of the output leads of decoder 154 is connected to different portions of the logic circuits to provide actuation of the portions of the logic circuitry associated with the special codes. Decoder 154 is enabled only while a binary one level is derived from normal address decoder 85, a result achieved by connecting output lead 89 of decoder 85 to enable input terminal 155 of decoder 154.

Consideration is now given to the apparatus for entering the numerical inputs from operator station 16 and the clear input from operator station into the system of FIG. 5. The numerical information is entered by providing nine separate leads 161 for numerals 1–9 and lead 520 for numeral zero. The numerical indicating signal on leads 161 and the signal from lead 520, as coupled through OR gate 521, are supplied to a decimal to binary coded decimal converter 162 having four output leads 163 on which are derived a binary coded decimal signal indicative of the number of an activated numerical key of keyboard 32. A second input lead 522 to OR gate 521 is derived from wired OR gate 524 which derives a clear input from keyboard 32 and a clear input from line 130 of flip-flop 127. The signal on leads 163 is supplied to sixteen bit latch 164, which includes the ability to simultaneously store four decades of a binary coded decimal signal. Thereby, latch 164 can store all of the bits associated with the location of the tape designated by the operator activating four numerical keys in sequence.

To provide transfer of the four input bits on leads 163 to the four decades of latch 164, a gated clock source 165 is provided. Clock 165 includes a free-running oscillator and a binary counter having a maximum count of four, as well as circuitry for inhibiting counting after four pulses have been derived from its output and supplied to latch circuit 164. Clock 165 is enabled to count to the count of four each time a pulse is applied to its enable input terminal 166 by an output on lead 167 of converter 162. Converter 162 supplies a binary one signal to lead 167 in response to each numerical indicating signal being supplied to its input via leads 161. Clock 165 is selectively gated on in response to the operator activating the clear key of matrix 32, or in response to flip-flop 127 being activated to the set state to indicate that a branch preparation is in progress. In response to that branch preparation signal, numerals manually entered from operator station 16 are inhibited from being entered into the remainder of the electronic system of FIG. 5 and manual indexing prevented since latch 164 is effectively cleared in response to gated clock 165 being gated on while its binary coded decimal input line 163 has a numerical value of zero.

To provide an indication of the numerical value manually entered into keyboard 32, there is provided a sixteen bit latch and four digit display driver circuit 171. Latch and display driver circuit 171 is supplied with clock pulses from gated clock source 172, which is constructed identically to gated clock source 165. Gated clock 172 and converter 162 are activated by the clear signal derived from OR gate 524 and the branch preparation signal in a manner similar to the way described with regard to activation of the gated clock source 165 and sixteen bit latch 164. Gated clock source 172, however, is cleared solely in response to activation of the clear key of matrix 32, whereby the sixteen bit latch and display driver 171 are returned to a zero count in response to the clear key being depressed. An indication of the clear key depression is also supplied as a clear input signal to decimal to binary coded decimal converter 162, causing the converter 162 to be set to zero.

Consideration is now given to audio demodulator 81, by reference to FIGS. 6 and 7, which respectively are a schematic diagram of the demodulator and illustrations of waveforms supplied to and derived by the demodulator. Basically, the demodulator responds to the audio input signal on lead 13 to derive signals indicative of whether the amplitude of the audio envelope is approximately at a zero level, approximately at one-half of the maximum value, or equal to the maximum value. In response to the zero or maximum value envelope, non-return to zero binary signals are derived on lead 82, while in response to each audio signal having an envelope of approximately one-half the maximum value, a clock pulse is derived on lead 83. The derivation of the signals on leads 82 and 83 occurs regardless of the speed of tape 33.

To provide detection of the amplitude of the audio carrier on lead 13, threshold detector circuits 601 and 602 are driven in parallel by the signal on lead 13 and provide binary one signals in response to the positive amplitude of the sinusoidal carrier on lead 13. Detectors 601 and 602 derive binary one outputs when the input amplitude of the audio signal on lead 13 is greater than twenty-five percent and seventy-five percent, respectively, of the full amplitude of the carrier. Retriggerable one shot multivibrators 201–204 are provided to decode the envelope of the audio signal. The time period of the one shot multivibrators is established such that they are always retriggered by the outputs of the threshold detectors before the normal time out periods thereof as long as the tape speed is above a predetermined value established by the frequency of the audio carrier and the tape speed changes.

Two pairs of retriggerable one shots are provided for each envelope amplitude detector to enable the circuit to detect audio carriers having differing frequencies, as result from driving the tape at different speeds. In response to the tape being driven at a normal speed, multivibrators 202 and 203 are enabled, while multivibrators 201 and 204 are enabled in response to the tape being driven at high speed in either the forward or reverse direction. Enabling of the one shots 202–203 is provided by supplying the play indicating signal on lead 26 to enable input terminals 207 and 208 of one shots 202 and 203. One shots 201 and 204 are enabled while the tape is moving at high speed in either direction by coupling the signal on lead 26 through inverter 200 and thence to enable input terminals 209 and 210 of these one shots. Even though one shots 201 and 204 are enabled while the tape is stopped, such enabling does not result in any finite output signal from the one shots because no signals are supplied to them from detectors 601 and 602. The use of retriggerable one shots is preferable over other types of audio detectors, such as a diode driving a low pass filter, because five cycles of the signal are not generally enough to provide the required charging and discharging of capacitors of such detectors.

It is to be understood that while only two pairs of one shots are illustrated for each speed detection range, additional one shots may be added, if the fast forward and rewind rates of the tape in some other tape players have an excessively wide speed range. All of the one shots associated with a particular envelope amplitude are connected to common input and output terminals, whereby the one shots 201 and 202 for detecting seventy-five percent of the maximum envelope amplitude are connected to output terminal 212 while the one shots 203 and 204 for detecting an envelope amplitude of twenty-five percent or more of the maximum amplitude are connected to output terminal 213.

It is thereby seen that in response to a data half bit having the maximum amplitude, binary one levels are derived at terminals 212 and 213, while a binary one level is derived on terminal 213 to the exclusion of terminal 212 in response to a clock half bit being supplied to lead 13. Binary zero levels are derived on terminals 212 and 213 in response to a zero amplitude envelope. For the exemplary input waveform on lead 13, indicated by FIG. 7A, the signals at terminals 212 and 213 are represented by the waveforms of FIGS. 7B and 7C, respectively.

To convert the signals at terminals 212 and 213 into non-return to zero (NRZ) and clock signals derived from leads 82 and 83 respectively and indicated by waveforms 7D and 7E, the signals at terminals 212 and 213 are coupled to a flip-flop 215 comprising crosscoupled NOR gates 216 and 217, and to input terminals of NAND gate 218. Coupling of the signal at terminal 212 to flip-flop 215 and the input of NAND gate 218 is via inverter 214. The output of flip-flop 215, at the output terminal of NOR gate 216, is directly coupled to lead 82, while the output of NAND gate 218 is supplied through inverter 219 to lead 83. It is noted that the NRZ waveform of FIG. 7D has positive transitions substantially coincident with the leading edges of full bits of the waveform of FIG. 7A, while the clock pulses of FIG. 7E are substantially coincident with the half maximum amplitude envelopes of FIG. 7A.

Consideration is now given to the logic circuitry for deriving and responding to control signals of FIGS. 1 and 5 in response to the operator activating the function keys of keyboard 32. To simplify the exposition, a separate logic diagram is provided for each of the function keys, but there is a considerable number of interconnections between the different logic circuits.

Initially, consider the play mode operations which cause the tape to be moved forward at normal speed so that an intelligible audio-video signal is supplied to the television receiver 14 by lead 12. In addition, initiation of the play mode results in the derivation of signals on leads 21 and 25 to place the tape in situ against the scanner disc assembly 51 and provide for normal tape drive speed. Initiation of the play mode occurs in response to depression of the play key of matrix 32, provided that a branch operation is not being performed. The play mode is also automatically initiated in response to a play command special function signal being sensed following a repeat or skip operation if the play-pause supervisory switch at station 17 is in the play position.

To these ends, the play logic circuit of FIG. 8 includes contacts 301 responsive to manual energization of the play key for supplying a positive d.c. enabling voltage from terminal 302 to lead 303. The positive voltage on lead 303 is supplied in parallel to one input of selectively inhibited AND gate 300 and to one shot pulse generator 304 which is triggered in response to the leading edge of the voltage on lead 303 so that the system cannot be continuously activated if the operator holds down the play key. The pulse derived from pulse generator 304 is supplied to a clear, i.e., reset, input terminal 306 of flip-flop 305, having a set input terminal 307 that is responsive to one of the fifteen output leads of special code decoder 154, FIG. 5. Special code signal number 5 (see the Table) is supplied to terminal 307 to indicate that the special code for automatically providing a pause in the tape movement from the play mode has been sensed from track 36.

In response to flip-flop 305 being activated to the set state, a binary one signal is supplied to an inhibit terminal of gate 300, whereby the output of gate 300 is maintained at a binary zero level regardless of the state of its other input signals. A further input for gate 300 is selectively provided by switch 308 which is responsive to the supervisory switch designated "play-branch inhibit" fron control station 17. Switch 308 includes a first terminal 309 which supplies a positive voltage through the switch to the input of gate 300, whereby the gate is capable of being enabled when the switch is engaged to terminal 309. Switch 308 includes a second terminal 310 that is engaged by the switch contact when the supervisory switch is activated to the "branch inhibit" condition. Thereby, activation of switch 308 so that the switch contact engages terminal 310 inhibits the play mode whenever there exists an active branch storage (flip-flop 109 being set). To provide a signal indicative of non-active branch storage, to enable gate 300, the output signal of active branch storage flip-flop 109, FIG. 5, is supplied to inverter 311 and thence to contact 310.

The output signal of 300 can, therefore, only have a binary one value while (1) play switch 301 is depressed and supervisory switch 308 is in the play mode or (2) while supervisory switch 308 is in the branch inhibit condition and the circuitry of FIG. 5 is not sensing an active branch storage and in each case, provided special code number 5, relating to automatically generating a pause from play mode, is not active. Since one shot pulse generator 304 responds only to the leading edge of the waveform derived on lead 303, the student cannot keep his finger on the play switch and thereby override the special code number 5 input to flip-flop 305 that inhibits gate 300.

To enable the play mode to be automatically initiated at the completion of skip or repeat operations, the output of gate 300 is combined with a signal derived from the play-pause supervisory switch (not shown in FIG. 8). As described infra, the supervisory switch is responsive to signals indicating that a repeat or a skip operation has been completed. The switch is connected to provide an automatic pause or to initiate the play mode in response to the skip or repeat operation being completed. When the switch is activated to automatically initiate the play mode, a binary one signal can be coupled by it to lead 312 and thence to the input of OR gate 315.

The output of OR gate 315 is applied to clear terminal 311 of flip-flop 109 to remove any stored active branch signal and thereby prevent lock out of the play mode. The output of OR gate 315 is also supplied in parallel to logic circuitry associated with the rewind, fast forward, pause, skip, repeat, and index functions to disable (clear or inhibit) these functions in response to the play function being initiated. The play function is initiated by supplying a binary one output of OR gate 315 to a set input terminal 316 of flip-flop 317, which when activated to the set state, provides an indication that the play mode has been initiated. Flip-flop 317 includes a reset input terminal 318 which is responsive to signals derived from the stop, rewind, fast forward, pause, skip, repeat, and index logic circuits. Thereby, initiation of any of the functions associated with these logic circuits results in resetting of flip-flop 317.

The output signal of flip-flop 317 is supplied via lead 319 to logic circuitry included for the automatic pause function. The output signal of flip-flop 317 is also applied to circuitry that controls the derivation of control signals on leads 21 and 25 to cause the tape to be engaged with the heads and the tape to be driven at the normal forward speed, for play operation. To these ends, there is provided logic circuitry including AND gates 321, 322 and 323, as well as inverters 324 and 325. Inverter 324 is responsive to the signal on lead 26, which indicates that the tape is being driven in the play mode. In response to the output signal of inverter 324 and the signal derived from flip-flop 317, AND gate 321 derives a control signal to cause the tape to be driven in the play mode, provided that the flip-flop 317 is storing a signal to initiate the play mode and the tape is not already being so driven. In response to flip-flop 317 being set and the tape being driven in the play mode, AND gate 322 derives a binary one output signal that enables AND gate 323 and permits the gate to determine if the tape is engaged to the pickup heads. If the tape is not engaged to the pickup heads, a binary zero level on lead 30 is converted to a binary one level by inverter 325 and AND gate 323 derives a binary one output that is supplied to lead 25 to cause the tape and heads to be engaged. AND gate 322 also supplies a signal in parallel to logic circuits for the pause and skip functions, enabling these logic circuits to be provided with an indication that the play mode has been initiated and that the tape is being advanced at the normal operating speed.

Consideration is now given to the logic for enabling the system to respond to depression of the index key of keyboard 32. As long as the system does not have an active branch storage, activation of the index key initiates a search, at high speed in either the forward or reverse direction, for the index location number indicated by display 33, as determined by activation of the numerical keys of keyboard 32 except when the display contains all zeros, which initiates the special branching operation, described supra. In response to the tape reaching the specified location, or the closest coded location identified on track 36, the system is activated to the pause mode. Indexing can be performed only when the index-branch supervisory switch is in the "index-branch" position, rather than the "branch" position which prevents manual indexing. Also, if the system has an active branch storage signal, the operator is unable to control the motion of the tape by depressing the index key.

The index logic circuit is illustrated on FIG. 9, wherein there is illustrated contacts 331 which are closed in response to depression of the index key to supply a positive d.c. voltage at terminal 332 to one input of AND gate 333. AND gate 333 includes a second input, responsive to the output of OR gate 334, which indicates whether the supervisory branch-index switch is in the branch or branch-index condition, and if in the latter condition whether an active branch has been sensed by the circuitry of FIG. 5. Alternatively, OR gate 334 enables AND gate 333 in response to the circuitry of FIG. 5 indicating that an active branch is being executed while a valid selection has been made. To these ends, the first input to OR gate 334 is derived in response to energization of supervisory branch-index switch 335. Switch 335 includes an open circuited contact 336 which is engaged by the switch armature when the supervisor activates the branch-index switch to the branch condition. Switch 335 contains a further contact 337 which is engaged by the switch when the supervisor activates the switch to the branch-index condition. Terminal 337 is connected to the output of inverter 311, FIG. 5, which is responsive to the output of flip-flop 109. Thereby, terminal 337 is supplied with a binary one level as long as the system is not executing or sensing an active branch storage. The other input to OR gate 334 is responsive to the output of AND gate 102, FIG. 5, which has a binary one value in response to the system of FIG. 5 responding to a branching code and a valid branching selection being made.

The output of AND gate 333 is supplied in parallel to reset input terminals of flip-flops included in the pause, rewind, fast forward, skip, and repeat logic circuits, as well as to the reset terminal of flip-flop 317 of the play logic circuit. Thereby, in response to the index mode being initiated, the remaining modes are disabled. The output of AND gate 333 is also applied to a set input terminal 341 of flip-flop 342. Flip-flop 342 includes a reset input terminal 343 that prevents the derivation of a binary one from the flip-flop in response to the indexing operation being completed, the stop key being depressed, or the initiation of the play, pause, rewind, or fast forward operations while there exists a non-active branch storage, FIG. 5. To these ends, the reset terminal 343 is responsive to OR gate 344 that is responsive to an end of index signal derived on lead 345, as well as to a signal from the stop logic circuitry, derived on lead 346. A further input to OR gate 344 is derived from AND gate 347, having one input responsive to the output of inverter 311, FIG. 5, and indicating there is no active branch storage. AND gate 347 includes a second input which is responsive to set terminals of flip-flops included in the play, pause, rewind and fast forward logic circuits and which indicates that these functions have been initiated.

A binary one output signal of flip-flop 342 indicates that the index mode has been initiated. The indication that the index mode has been initiated is combined with an indication that the branch storage is active to disable and prevent initiation of the play, pause, rewind, fast forward, skip and repeat functions. To these ends, the output signal of flip-flop 342 is combined with the output signal of flip-flop 109, FIG. 5 in AND gate 348, the output of which is applied in parallel to reset input terminals of flip-flops included in the pause, rewind, fast forward, skip and repeat logic networks and to the reset terminal of flip-flop 317 of the play logic network, as well as into the branching mode input on lead 113 of FIG. 5.

A binary one output signal of flip-flop 342 is also employed to control engagement of the heads and tape, as well as to command rapid movement in either direction of the tape relative to the heads until the requested index location has been reached. To these ends, a determination is initially made as to whether the tape drive is engaged for either fast forward or reverse by supplying the play and stop indicating signals on leads 26 and 27 to OR gate 350 and thence to inverter 351 which derives a binary one output signal in response to the high speed tape drive being engaged. The binary one output signal of inverter 351 is supplied to AND gate 352 that is also responsive to the output of flip-flop 342, whereby AND gate 352 derives a binary one signal to indicate that the system is in the branch or index mode. If the tape is not in a high speed mode, a signal is supplied to lead 22 to control fast forward movement of the tape by combining the stop indicating signal on lead 27 and the play signal on lead 26 with the output of flip-flop 342 and AND gate 353, which derives an output that is supplied to lead 22.

In response to the output of AND gate 352 indicating that the high speed tape drive is engaged, a determination is made as to whether the tape is engaged against the playback heads. If the tape is not so engaged, a command signal for this purpose is supplied to lead 25. To these ends, inhibit gate 354 is provided and includes an inhibit input terminal responsive to the signal on lead 30 which indicates that the tape is engaged to the heads. A second input of inhibit gate 354 is responsive to the output of AND gate 352, whereby AND gate 354 derives a binary one signal only in response to a binary one signal being derived from AND gate 352 and a binary zero level being applied to lead 30 to indicate that the tape is not engaged. A binary one output signal of AND gate 354 is applied to lead 25 to cause the tape and playback heads to become engaged.

In response to the tape and playback heads being engaged, binary one signals on lead 30 and at the output of AND gate 352 are applied to the inputs of AND gate 355 to enable a comparison of the tape position and the manually entered index number to control the direction of tape movement. To these ends, the three output signals of comparator 91, FIG. 5, which respectively indicate that the manually entered input number of keyboard 32 is less than, equal to, or greater than the tape location number are respectively applied to leads 356, 357 and 358. Leads 356, 357 and 358 of comparator 91 supply to the logic network of FIG. 9 binary one signals respectively indicative of the tape number exceeding the index number, the tape number equalling the index number, or the tape number being less than the index number. The signals on leads 356, 357 and 358 are respectively applied to AND gates 361, 362, and 363, all of which are enabled by a binary one output of AND gate 355. In response to AND gate 361 deriving a binary one level, indicative of the tape number exceeding the manually entered number and AND gate 355 being enabled, a determination is made as to whether the tape drive is in the rewind condition. To this end, the binary signal on lead 29 is supplied as an inhibit input to inhibit gate 364 and as an enable input to AND gate 365. Gates 364 and 365 are driven in parallel by the output signal of AND gate 361, whereby a binary one level is derived from AND gate 364 and applied to lead 23 to indicate that the tape is to be driven in the reverse or rewind direction. If the tape is already being driven in the reverse direction and the tape number exceeds the manually entered index number, a binary one output signal is derived from AND gate 365 and thence to an input of OR gate 366.

In response to the number on the tape being less than the manually entered index number, and a binary one signal being derived on lead 29 to indicate that the tape is being rewound, the tape direction should be reversed and drive should be forward at high speed. To these ends, the signal on lead 29 is applied with the output signal of AND gate 363 to AND gate 367. The output of AND gate 367 is supplied to lead 22, whereby the tape is driven in the forward direction at high speed. To provide a signal indicative of the tape number being less than the manually indexed number while the tape is not being rewound, the signal on lead 29 is applied to an inhibit input terminal of inhibit gate 368, having an enable input terminal responsive to the output of AND gate 363. The signal derived from inhibit gate 368 is applied as an input to OR gate 366 whereby OR gate 366 derives a binary one output in response to the tape being driven in the correct direction at high speed. The binary one signal at the output of OR gate 366 is supplied to set input terminal 369 of flip-flop 370 whereby the flip-flop derives a binary one signal whenever the tape is being driven in the proper direction to achieve the location requested by the manual indexing or branching operation. After the tape has reached the location associated with the manually indexed or branched number, a pulse is supplied to reset terminal 371 of flip-flop 370, in a manner described infra. The output signal of flip-flop 370 is combined in AND gate 372 with the output signal of OR gate 375. The binary one signal at the output of OR gate 375 is present whenever $N_T = N_I$, as supplied by AND gate 362 or from a binary one level from exclusive OR gate 374; the binary one level from gate 374 is developed when the two inputs to gate 374 are at a different binary level to indicate that the tape drive direction is opposite from the desired direction, whereby the number indexed by the operator has been passed by the tape and a pause in the tape movement should be provided. To this end, a binary one is supplied to one input of gate 374 from AND gate 361 which derives a binary one output when $N_T$ exceeds $N_I$. The second input to gate 374 is supplied from lead 29 which indicates the tape is being driven in the high speed reverse mode. AND gate 372 thereby derives a binary one signal in response to the tape reaching the specified location or the closest coded location identified on track 36.

To reset flip-flop 370, pulse generator 373 is provided to be responsive to the trailing edge of the binary one signal derived from AND gate 372 and supplies a signal to reset terminal 371. The binary one output signal of AND gate 372 is also applied to lead 345 to indicate the end of the indexing operation and this signal is supplied, to the clear terminal 111 of flip-flop 109, and as indicated supra, through OR gate 344 to reset flip-flop 342.

Consideration is now given to the operations performed in response to the operator activating the skip key of keyboard 32. In response to the skip key being activated, the tape is advanced at high speed if a prior skip command has been initiated in response to a special control function code being derived from track 36, provided the skip supervisory switch of station 17 is in the enable position. The skip key must be depressed by the operator at station 16 for approximately two seconds to assure that the operator actually desires to have the skip operation performed. The skip operation is terminated in response to an end of skip command special control function code being sensed from tape track 36. In response to the end of skip command being sensed, the system is activated to the pause or play mode, depending on the position of the play-pause switch of supervisory station 17.

To perform these functions, the circuitry of FIG. 10 is provided. In response to depression of the skip key, switch 381 is closed and the positive voltage at terminal 382 is applied to lead 383. The signal on lead 383 is selectively coupled through supervisory switch 384 which the supervisor activates at station 17 when it is desired for the operator to be able to skip portions of the programmed information. If, however, it is desired for the operator to proceed in sequence through the programmed material on tape 33, supervisory switch 384 is activated against open circuited contact 385.

The signal coupled through switch 384 is applied in parallel to reset terminals of flip-flops included in the rewind, fast forward, pause and repeat logic circuits as well as to flip-flops 317 and 342 of the play and index logic circuits, with the connection to the latter flip-flop being through AND gate 347 and OR gate 344. Thereby, depression of the skip key inhibits all six of these functions.

The signal coupled through switch 384 is also applied to a timer 386 having a duration of approximately two seconds. Timer 386 derives a binary one output signal in response to the voltage at terminal 382 being applied to its input for a duration of two seconds or more. Thereby, the operator must positively hold the skip key down to cause closure of switch contact 381 for a period of at least two seconds to enable the skip function.

The output signal of timer 386 is applied as one input to AND gate 387, having a second input responsive to an output of flip-flop 388. Flip-flop 388 includes an enable input terminal 389, as well as set and reset input terminals 390 and 391. Enable input terminal 389 of flip-flop 388 is connected to be responsive to the signal on lead 26, FIG. 8, at the output of AND gate 322 of the play logic circuit and which has a binary one value to indicate that the play mode is activated. Flip-flop 388 can therefore be changed in response to the signals applied to terminal 390 only while the play mode is activated. Flip-flop 388 is set in response to the output of decoder 154 corresponding with special code number 3, that enables activation of the skip mode. Flip-flop 388 is reset in response to the stop, index or branch modes being initiated or to the output of decoder 154, special code 4, denoting the end of the skip function or signifying the end of the tape segment programmed for skip. To these ends, the output of AND gate 348 of the index logic circuit, FIG. 9, and an output from a flip flop included in the stop mode logic circuitry and the output of decoder 154 special code 4 are applied to OR gate 392 which drives the reset input of terminal 391. Hence, AND gate 387 derives a binary one output signal only in response to switch 381 being closed for at least two seconds while the system is in the play mode and after a special code for enabling the skip mode has been detected from track 36.

The binary output signal of AND gate 387 is applied to set input terminal 393 of flip-flop 394, which includes a reset input terminal 395 driven by flip-flops included in the stop, rewind, fast forward and repeat logic circuits, whereby the flip-flop 394 is reset whenever any of these functions have been initiated. Flip-flop 394 is also reset in response to the complement of the signal derived from lead 30 of the play logic circuit, FIG. 8, as coupled through inverter 325 to indicate that the tape and playback heads are not engaged. resetting of flip-flop 394 is further provided in response to a binary one output signal of AND gate 348 in the index logic circuit which indicates that indexing has been initiated and that an active branch has been detected.

A binary one signal is derived from flip-flop 394 to indicate that the skip mode has been initiated. Initiation of the skip mode requires the tape to be driven in the forward direction at a high rate of speed, if it is not already being driven in this manner. To these ends, the output signal of flip-flop 394 is coupled through one input of inhibit gate 398, having an inhibit input terminal responsive to the signal on lead 28 which indicates that the tape is being driven in the fast forward mode. Thereby, inhibit gate 398 derives a binary one signal if the skip mode has been initiated and fast forward operation has not been sensed, and this binary one level is applied to lead 22 to cause the tape to be driven at high speed in the forward direction.

To enable the skip mode to be terminated in response to a coded signal from track 36 indicating that skip mode termination should be effected because the tape has reached the portion thereof where the presentation of the audio-video information should be resumed, the output of flip-flop 394 is combined in AND gate 399 with special code number 4, derived from decoder 154. Special code number 4 indicates that upon completion of the skip mode an automatic pause in the audio-visual presentation should be initiated or that the play mode should be immediately instigated. Initiation of the pause or play mode depends upon the position of the play-pause supervisory switch 401. AND gate 399 derives an output signal that is fed through OR gate 400 (also responsive to an input from the repeat logic circuit, described infra) to play-pause supervisory switch 401 that selectively connects the output of AND gate 399 to contact 402 or contact 403. Contact 402 is connected to circuitry in the pause logic circuit to initiate the pause operation after the skip operation has been performed. Contact 403 is connected to line 312 of OR gate 315 and to the set input terminal 316 of flip-flop 317, included in the play logic circuit, FIG. 6, to initiate the play mode of operation after the skip function has been performed.

Consideration is now given to the pause function operations which differ from the stop operation because the tape automatically resumes at the same location it had prior to the pause operation, but does not allow the cartridge or cassette to be removed from the playback unit 11. The pause operation is performed in response to manual activation of the pause key any time the pause supervisory switch of station 17 is in the operate position, provided no pause inhibit function has been initiated by the branching control circuitry included in FIG. 5. The pause operation is automatically initiated in response to: (1) a special code number 1 being derived from track 36 when the system is in the play mode, provided no pause override inhibit function has been initiated by the play logic, at the output of OR gate 315, FIG. 8 or by the removal of special code number 1 enable signal provided on lead 319 from flip-flop 317 of the play logic by momentarily depressing the skip key which resets flip-flop 317; (2) a special code number 2 being derived from track 36 if the system has been operating in the repeat mode, provided the play-pause supervisory switch at station 17 is in the pause position; (3) special code number 4 being derived from track 36 if the system has been previously in the skip mode, provided the play-pause supervisory switch is in the pause position; (4) a pause command signal being derived from AND gate 72 of the index logic circuit, FIG. 9, after an index or branching function has been initiated; and (5) special code number 5 being read from track 36, provided the system is in the play mode at the time that code number 5 is read.

To initiate the pause operation, the logic circuitry of FIG. 11 is provided. In response to the pause key being energized, contacts 411 are closed, whereby the positive voltage at terminal 412 is fed to lead 413 and thence to one input of AND gate 414, which is also responsive to the output of inverter 311, FIG. 5. A binary one output of inverter 311 indicates that the system of FIG. 5 is not in an active branch mode. A binary one output of AND gate 414, indicative of manual energization of pause switch 411 while no active branch signal is present, is supplied in parallel to reset input terminals of flip-flops included in the rewind, fast forward, and repeat logic circuits, as well as to the reset input terminals 318 and 395 of flip-flops 317 and 394 included in the play and skip logic circuits, as well as to an input of AND gate 344 of the index logic circuit. The output of AND gate 414 is fed through OR gate 415 to a set input terminal 416 of flip-flop 417.

The manually initiated pause signal supplied by AND gate 414 to the set terminal 416 of flip-flop 417 is combined in OR gate 415 with automatically derived pause signals. One of the automatic pause inputs to OR gate 415 is derived in response to a binary one being derived from decoder 154, FIG. 5, to indicate the energization of special code number 5, that provides for secure pauses. This binary one signal is supplied to AND gate 418 that is also responsive to lead 26, FIG. 1, that has a binary one value to indicate the tape being driven at the normal forward speed in the play mode. Thereby, a binary one output can be derived from AND gate 418 only while the tape is in the play mode and a secure pause is being detected. This binary one signal compels the system to be driven into the pause mode until the operator causes deactivation of the play mode. The output signal of AND gate 418 is coupled to the set input of flip-flop 417 via OR gate 415. A second automatic set input signal for flip-flop 417 is derived by supplying special code number 1 of decoder 154 to AND gate 419, having a second input responsive to the output of flip-flop 317, on lead 319 of the play logic circuit, FIG. 8. Thereby, a binary one signal is derived from AND gate 419 in response to non-secure pause special code number 1 being sensed and the play flip-flop not being reset, and the binary one signal provides a pause in the audio-video presentation to enable the operator at station 16 to respond, for example, to a question or to analyze the equipment he is testing to determine its state. The non-secure pause derived from gate 419 is immediately disabled in response to the operator activating any of the stop, rewind, fast forward, pause, skip, repeat or index keys. A further automatic pause is provided by supplying a binary one input signal to set terminal 416 in response to an indexing operation being completed, as derived from the output of AND gate 372, on lead 345, of FIG. 9 and as coupled to OR gate 415 via lead 421.

In response to the play-pause supervisory switch at station 17 being energized to the pause condition, wherein contact 401 (FIG. 10) engages terminal 402 to indicate that the pause function is automatically provided after a skip or repeat operation, a binary one output signal of OR gate 401 is coupled to the set input terminal 416 of flip-flop 417 via OR gate 415.

Flip-flop 417 includes a reset input terminal 420 which causes flip-flop 417 to be reset in response to manual activation of the keys provided for the stop, rewind, fast forward, play, skip, repeat and index functions. To these ends, output signals from OR gate 315, FIG. 8, AND gate 333, FIG. 9, and from switch 384, FIG. 10, are applied to reset terminal 418. Similar signals are supplied to terminal 420 from the remaining logic networks, as described infra, in response to the circuits associated with these functions being initiated.

A binary one output signal of flip-flop 417 indicates that the tape should be disengaged from its drive, and that the tape and playback heads should be engaged so that a pause in the presentation of the audio-visual information is provided. To these ends, a determination is initially made as to whether the tape and heads are engaged while a binary one signal is derived from flip-flop 417, by supplying the output of the flip-flop in parallel to AND gate 421 and inhibit gate 422. AND gate 421 is enabled in response to a binary one signal on lead 30, indicative of the tape and heads being engaged, while a binary one on lead 30 inhibits gate 422. A binary one output of gate 421 enables AND gate 423, having a second input which has a binary one value in response to the tape being driven, as derived by supplying the signal on stop indicating lead 27 to inverter 424, the output of which is supplied to the other input of AND gate 423.

In response to the tape being disengaged from the heads while a binary one signal is derived from flip-flop 417, inhibit gate 422 derives a binary one output that is applied in parallel to AND gate 425 and inhibit gate 426. AND gate 425 is enabled in response to a binary one output of inverter 424, while gate 426 is inhibited in response to such an output from inverter 424. Thereby, in response to disengagement between the tape and pickup heads and the tape drive being disengaged, inhibit gate 426 derives a binary one output which is applied to lead 21, causing the tape to be driven in the normal, forward direction to achieve the play mode. In contrast, in response to disengagement of the heads and tape while the tape is in the play mode, AND gate 425 derives a binary one output signal that is supplied to lead 25 to cause the tape and heads to be engaged, at which time the binary one output of AND gate 423 is supplied to lead 424 to cause a stop of the tape motion.

Consideration is now given to operations performed by the system in response to manual activation of the repeat key of matrix 32, provided the supervisory switch for the repeat operation is energized to the "operate" position at station 17. Activation of the manual repeat key initiates fast reverse operation of the tape and automatically provides pauses or play operation at the appropriate point in the audio visual information, determined by an "end repeat" special code signal on track 36.

The logic circuitry for performing the repeat function is illustrated on FIG. 12 and includes switch 431 having contacts closed in response to depression of the repeat key to supply the positive d.c. voltage at terminal 432 to repeat supervisory switch 433. Repeat supervisory switch 433 is connected to open circuited contact 434 if the supervisor desires to inhibit the repeat function and cause the student to go through the audio visual material without being able to repeat any portions. If the supervisor desires to enable the student to repeat certain portions of the audio visual presentation, switch 433 is connected to contact 435 which is connected to the reset input terminals of flip-flops 317, 394 and 417 included in the play, skip and pause logic circuits, as well as to similar flip-flops included in the fast forward and rewind logic circuits, as described infra. In addition, the signal on contact 435 is applied to AND gate 347 of the index logic circuit and thence selectively to the reset input terminal of flip-flop 342 of the index logic circuit and to clear terminal 111 of active branch flip-flop 109, FIG. 5. Thereby, in response to the repeat switch 431 being activated, the fast forward, rewind, play, pause, skip and index operations are inhibited and no active branch signal is stored.

The signal at terminal 435 is applied to set input terminal 436 of flip-flop 437, having a reset input terminal 438. A binary one level is applied to terminal 438 in response to the system executing the functions of stop, rewind, play, pause, fast forward, skip, and indexing; a binary one signal is also applied to reset terminal 438 in response to the system being in a branching mode. Flip-flop 438 is also reset in response to the complement of the signal derived from lead 30, as derived from the output of inverter 325 (FIG. 8) to indicate disengagement between the tape and playback heads. To these ends, terminal 438 is connected to be responsive to the output signals of OR gate 315 in the play logic circuit, AND gate 414 in the pause logic circuit, AND gate 333 in the index logic circuit and AND gate 348, FIG. 9. In addition, terminal 438 is driven in parallel with the two second timer 386 of the skip logic circuit and is driven in response to similarly derived signals of the stop and rewind logic circuits, as described infra.

With flip-flop 437 in the set state, a binary one signal is derived from its output lead and is combined with an indication that special code number 2 has been detected by decoder 154, FIG. 5, to provide an automatic muse or to initiate the play operation at the tape location presently being read by the pickup head for track 36, i.e., at the tape location where special code 2 is located. To this end, special codde number 2 from decoder 154 and the output of flip-flop 437 are combined in AND gate 439, the output of which is supplied to OR gate 400, FIG. 10, and thence to the play or pause logic circuit, depending upon the play-pause supervisory switch position, as described supra. Thereby, the system remains in the repeat mode until the tape location containing the special code for the end of the repeat operation is detected, at which time the system shifts to the play or pause mode, depending upon the position of the supervisory switch.

To enable the repeat operation to be performed, it is necessary to drive the tape in the reverse direction and, thereby determine if the tape is being so driven. To this end, the output signal of flip-flop 437 is supplied to inhibit gate 441, having an inhibit terminal responsive to the signal on lead 29 indicative of the tape being driven in the reverse direction. Thereby, inhibit gate 441 derives a binary one signal in response to flip-flop 437 being set and the tape not being driven in the reverse direction, and this binary one signal is applied to lead 23 to cause the tape to be driven in the reverse direction.

Consideration is now given to the operations performed in response to the operator activating the stop key of keyboard 32. In response to the stop key being activated, the recording medium and playback heads are retracted from each other after which the tape is stopped, whereby the cartridge or casseette can be removed from playback unit 11.

The logic circuit for performing the functions associated with activation of the stop key is illustrated in FIG. 13 and comprises a switch 445 that is closed in response to depression of the stop key to connect the d.c. voltage at terminal 446 to the set input terminal 447 of flip-flop 448, also having a reset input terminal 449. In response to closure of switch 445, flip-flop 448 is activated to the set state and supplies signals to inhibit the play, rewind, fast forward, pause, skip, repeat and index functions. To these ends, the output signal of flip-flop 448 is supplied to flip-flop 317 of the play logic circuit, flip-flop 394 of the pause logic circuit, flip-flop 437 of the repeat logic circuit, as well as to corresponding flip-flops of the rewind and fast forward logic circuits. Also, the output signal of flip-flop 448 is applied to lead 346 and OR gate 344, thence to the reset terminal of 342 of the index logic circuit.

In response to flip-flop 448 being activated to the set state, a determination is made as to whether the tape is being driven. To this end, the output of flip-flop 448 is applied in parallel to AND gate 451 and inhibit gate 452, which are respectively enabled and inhibited in response to a binary one signal on lead 27, whic indicates that the tape is being driven. In response to the tape not bein driven, AND gate 451 derives a binary one output signal that is applied as enable inputs to AND gate 453 and inhibit gate 454. Gates 453 and 454 respectively have enable and inhibit input terminals responsive to the signal on lead 30, which has a binary one value in response to the tape and playback heads being in engagement. Thereby, inhibit gate 454 derives a binary one output signal in response to disengagement between the tape and heads while the tape is not being driven, and this binary one signal is applied to reset input terminal 449 of flip-flop 448, to prevent permanent lock-up of the flip-flop. A binary one output signal from gate 454 thereby indicates that the cartridge or cassette can be removed from tape playback unit 11. A binary one output signal of AND gate 453 signifies that the tape is stopped, but that it is engaged by the heads and the tape should be driven in the normal forward speed, a result attained by applying the binary one output of gate 453 to the play command lead 26.

A binary one output signal of gate 452 indicates that the tape is being driven when it is desired to have the system min the stop mode. To enable the system to enter the stop mode, the output signal of gate 452 is applied as enable signals to AND gate 455 and inhibit gate 456. A further enable input of AND gate 455 is responsive to the signal on lead 30, while the inhibit terminal of gate 456 is responsive to the signal on lead 30. Thereby, a binary one signal is derived from AND gate 455 in response to the tape being driven and engaged against the pickup heads, while a binary one signal is derived from inhibit gate 456 in response to the tape being driven, but the tape and heads being disengaged. The output signal of gate 456 is applied to lead 24 to cause the tape to be stopped. A binary one output signal of AND gate 455 causes the tape and heads to be disengaged from each other, a result achieved by supplying the binary one signal, a positive d.c. voltage, to coil 457 of relay 458, which has a normally closed contact 459 that is connected in series with lead 25. In response to normally closed contact 459 being open circuited in response to energization of coil 457, the voltage on lead 25 is removed, whereby disengagement between the tape and heads occurs.

Consideration is now given to the operations performed in response to the operator activating the fast forward key. Depression of the fast forward key initiates fast movement of the tape in the forward direction, outside the control of the information on track 36. The fast forward mode of operation can be inhibited by placing the fast forward supervisory switch at station 17 in a "non-operate" position.

Figure 14:
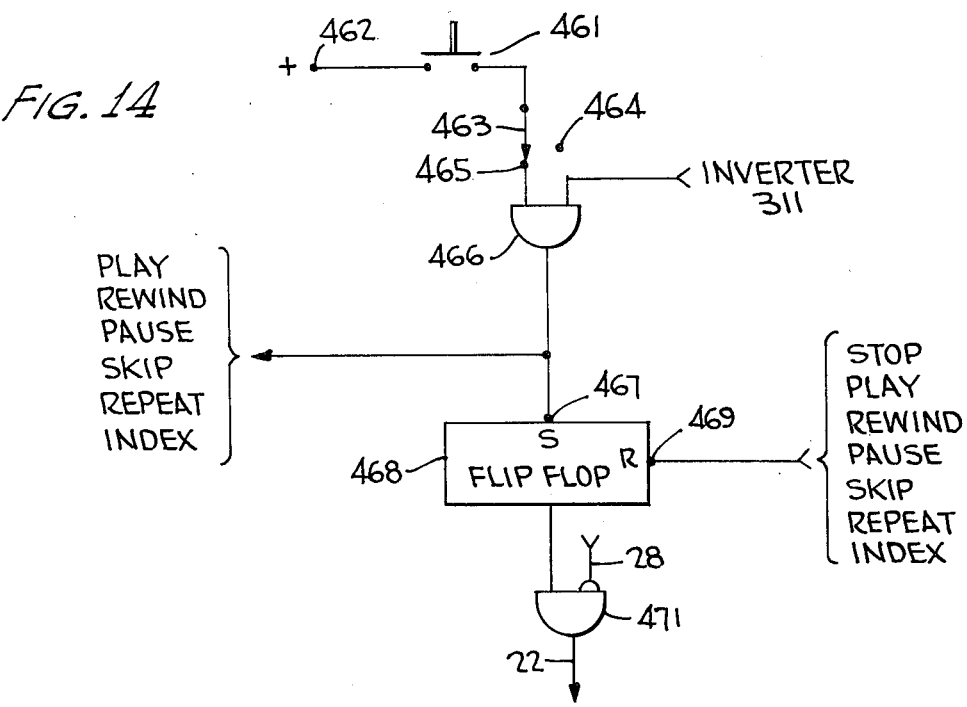

Reference is now made to FIG. 14 of the drawing wherein the circuit for performing the fast forward function is illustrated and comprises a switch 461 which is closed in response to depression of the fast forward key. In response to closue of switch 461, the positive d.c. voltage at terminal 462 is applied to supervisory switch 463 that is energized against open circuited contact 464 if the supervisor does not want the fast forward mode to be executed by the operator. If the supervisor desires to have the fast forward operation enabled, switch 463 is connected to contact 465 that is supplied as one input to AND gate 466. AND gate 466 includes a second input terminal responsive to the output of inverter 311, FIG. 5, and which has a binary one value only when the circuitry of FIG. 5 does not have an active branch storage signal. Thereby, AND gate 466 derives a binary one output signal in response to depression of the fast forward key, provided the supervisory switch enables the fast forward operation and the system does not have an active branch storage.

A binary one output signal of gate 466 prevents activation of the system to the play, rewind, pause, skip, repeat, and index functions. To these ends, the output signal of gate 466 is applied in parallel to reset input terminals of flip-flops 317, 394, 417, and 437 of the play, skip, pause, and repeat logic circuits, as well as to a similar reset terminal of a flip-flop included in the rewind logic circuit. The output of AND gate 466 is also applied to a reset input terminal of flip-flop 342, included in the index logic circuit, while coupling to the flip-flop 342 reset input terminal is via AND gate 344 and OR gate 347.

The output of AND gate 466 is also applied to the set input terminal 467 of flip-flop 468. Flip-flop 468 includes a reset input terminal 469, whereby the flip-flop 458 is reset or cleared in response to initiation of the stop, play, rewind, pause, skip, repeat, and index functions. To these ends, terminal 469 is driven by the output of flip-flop 448, in the stop logic circuit, OR gate 315 in the play logic circuit, AND gate 414 in the pause logic circuit, terminal 435 in the repeat logic circuit, AND gate 333 in the indexlogic circuit, as well as in parallel with the signal supplied to two second timer 386 of the skip logic circuit. Terminal 469 is also responsive to a signal from the rewind circuit, as described in infra.

In response to flip-flop 468 being activated to the set state, a determination is made as to whether the tape is being driven at high speed in the forward direction, and if not such action is taken. To this end, the output signal of flip-flop 468 is supplied to inhibit gate 471, having an inhibit input terminal responsive to the signal on lead 28, and indicative of the tape being driven in the forward direction at high speed. In response to a binary one output signal of flip-flop 468 and the tape not being driven in the forward direction at high speed, a binary one signal is derived by gate 471 on lead 22, to cause such fast forward movement of the tape.

Consideration is now given to the rewind operation, wherein activation of the rewind key initiates fast movement of the tape in the rewind direction, outside of the control of the program material on track 36. The rewind operation can be inhibited by the supervisory switch for the rewind function being activated to the "non-operate" state.

Figure 15:
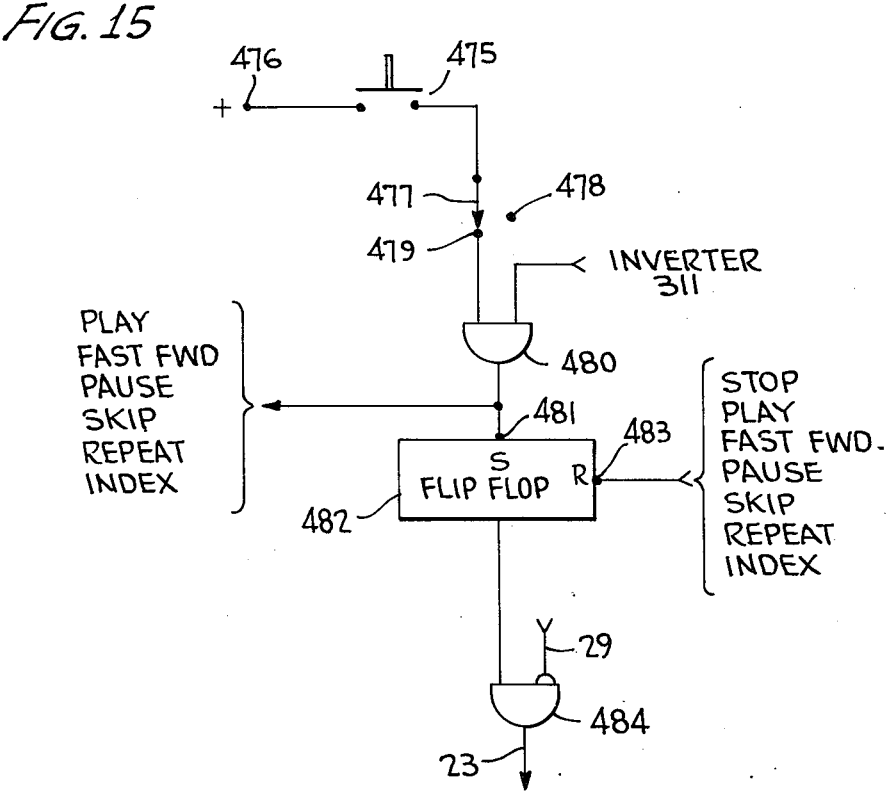

The logic circuitry for the rewind function is illustrated in FIG. 15 wherein there is included a switch 475 which is closed in response to depression of the rewind key to couple the d.c. voltage at terminal 476 to supervisory switch 477. If it is desired to inhibit the rewind function, switch 477 is energized so that it engages open circuited contact 478; if the rewind function is permitted, switch 477 engages contact 479 that is connected to one input of AND gate 480. A second input for AND gate 480 is derived from inverter 311, FIG. 5, and has a binary one level in response to a non-active branch storage signal. The output of AND gate 480 is thereby a binary one level in response to the rewind operation being validly entered in response to activation of switch 475, provided switch 477 engages contact 479 and no branching operation is being performed.

To prevent activation of the system to the play, fast forward, pause, skip, repeat, and index modes after the rewind mode has been initiated, the output of AND gate 480 is applied in parallel to reset input terminals of flip-flops 317, 468, 417, 394, and 437 of the play, fast forward, pause, skip, and repeat logic circuits. In addition, the output signal of AND gate 480 is applied to the reset terminal of flip-flop 342 in the index logic circuit, with such a connection being provided through AND gate 344 and OR gate 347.

The output signal of AND gate 480 is also supplied to set input terrminal 481 of flip-flop 482. Flip-flop 482 is reset in response to initiation of the stop, play, fast forward, pause, skip, repeat and index modes. To these ends, flip-flop 482 includes a reset input terminal 483 responsive to the outputs of flip-flop 448 in the stop logic circuit, OR gate 315 in the play logic circuit, AND gate 466 in the fast forward logic circuit, AND gate 414 in the pause logic circuit, contact 435 in the repeat logic circuit, AND gate 333 in the index logic circuit, and is driven in parallel with the input to the two second timer 386 of the skip logic circuit.

A binary one output signal of flip-flop 482 causes the tape to be rewound at high speed if it is not already being so wound. To this end, the output signal of flip-flop 482 is supplied as one input to inhibit gate 484, having an inhibit terminal responsive to the signal on lead 29, indicative of the tape being driven in the reverse direction at high speed. Gate 484 thereby derives a binary one signal in response to flip-flop 482 deriving a binary one signal and the tape not being driven in the reverse direction. The binary one output signal of gate 484 is applied to lead 23 to cause the tape to be driven in the reverse direction at high speed.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A system for automatically supplying information to an operator comprising a dynamic storage medium having at least one information track and a single coded data signal track, said coded data signal track having indicia for locations of the information in the information track, an operator station for deriving command signals for controlling movement of the medium, and means responsive to signals derived from the operator station and from the location indicia of the single coded data signal track for: (a) advancing the medium at a normal speed in the forward direction whereby the information is presented to the operator at a normal rate, and (b) moving the medium in the forward and reverse directions at high speeds such that no meaningful information is presented to the operator, said means for advancing and moving including means for reading the single coded data signal track while the medium is advanced at normal speed and moved at high speeds.

2. The system of claim 1 further including a supervisory station for selectively disabling predetermined command signals from the operator station to prevent coupling of the predetermined command signals to the means normally responsive to the command signals.

3. The system of claim 1 wherein the signal track includes a relatively constant frequency carrier while the medium is moving at a substantially constant speed, said carried having three predetermined envelope levels, two of said levels being associated with different binary values, and the third level being associated with clock pulses; said means responsive to the location indicia including: playback means responsive to the carrier, said playback means including means for detecting the three amplitude levels of the carrier, means responsive to the detected amplitude levels for deriving signals indicative of the magnitude of the binary data and of the occurrence of the clock pulses to derive a binary signal indicative of the coded data representing the information track location, means for deriving a signal indicative of a speed range for the medium, and means responsive to the speed range indicating signal for controlling response times of the detecting means.

4. The system of claim 3 wherein the detecting means includes means for deriving pulses having predetermined lengths dependent upon the speed of the medium and the frequency of the carrier.

5. A system for automatically supplying information to an operator comprising a dynamic storage medium having at least one information track and a single coded data signal track, said coded data signal track having indicia for locations of the information in the information track, an operator station for deriving command signals for controlling movement of the medium, and means responsive to signals derived from the operator station and from the location indicia of the single coded data signal track for: (a) advancing the medium at a normal speed in the forward direction whereby the information is presented to the operator at a normal rate, and (b) moving the medium in the forward and reverse directions at high speeds such that no meaningful information is presented to the operator, the data track including multi-bit binary words having first and second segments, said first segment including a first code indicative of the second segment having a value commensurate with the medium location where the word is located and a second code indicative of the second segment having a value commensurate with a medium location to which the medium is to be driven, means recognizing the first and second codes and responsive to the command signals for activating the means for moving so that the medium is moved at high speed to the location indicated by the second segment of words having the second code.

6. The system of claim 5 further including means responsive to the segments of the words indicating the first and second codes for providing a change in the medium movement in response to the medium reaching or passing the location indicated by the second segment of the word including the second code.

7. The system of claim 6 wherein the means for providing the change includes means for disabling the moving and advancing of the medium.

8. The system of claim 6 wherein the means for providing the change includes means for advancing the medium at the normal speed.

9. The system of claim 5 further including means for activating the moving means to return the medium to substantially the same location as it had prior to the medium being advanced to the location indicated by the second segment of the word including the second code.

10. The system of claim 9 wherein the said means for activating the moving means to return the medium is responsive to a command signal disassociated from said same location.

11. The system of claim 10 wherein said command signal is a clear signal.

12. The system of claim 9 wherein said command signal is a predetermined signal derived by the operator after the medium has been advanced through the information track immediately after the location indicated by the second segment of the word having the second code.

13. The system of claim 5 wherein plural command signals can be selectively coupled to the means for activating, means for deriving an output signal in response to the magnitude of values associated with the command signals being the same as successively detected words having the second code, and the means for activating causes the medium to move at high speed until the output signal is derived.

14. The system of claim 5 wherein the second segment of certain words having the first code includes indicia distinguishable from the locations, and means responsive to the distinguishable indicia and predetermined command signals for activating the moving means so that the medium is moved at high speed to substantially the location of the distinguishable indicia.

15. The system of claim 14 wherein the distinguishable indicia include command codes indicative of changing the motion of the medium, and means responsive to detection of a command code indicative of changing the motion of the medium for (a) deactivating the means for advancing at the normal speed, and (b) causing the medium to stop.

16. The system of claim 14 wherein the distinguishable indicia include command codes indicative of changing the motion of the medium, and means responsive to detection of a command code indicative of changing the motion of the medium, for (a) deactivating the means for moving at high speed, and (b) causing the medium to stop.

17. The system of claim 14 wherein the distinguishable indicia include command codes indicative of changing the motion of the medium, and means responsive to detection of a command code indicative of changing the motion of the medium, for (a) deactivating the means for advancing at normal speed and moving at high speed, and (b) causing the medium to stop.

18. The system of claim 5 wherein the data track includes command codes indicative of changing the motion of the medium, and means responsive to detection of a command code indicative of changing the motion of the medium, for (a) deactivating the means for advancing at normal speed, and (b) causing the medium to stop.

19. The system of claim 5 wherein the data track includes command codes indicative of changing the motion of the medium, and means responsive to detection of a command code indicative of changing the motion of the medium, for (a) deactivating the means for moving at high speeds, and (b) causing the medium to stop.

20. The system of claim 5 wherein the data track includes command codes indicative of changing the motion of the medium, and means responsive to detection of a command code indicative of changing the motion of the medium, for (a) deactivating the means for advancing at normal speed and moving at high speeds, and (b) causing the medium to stop.

21. The system of claim 5 wherein the data track includes a command code indicative of identifying the beginning of predetermined portions of the information track, and means responsive to said command code and a predetermined command signal for activating the means for moving so the medium moves at high speed to the predetermined portion of the information track indicated by the command code.

22. The system of claim 21 wherein the command signals are provided to repeat and skip certain portions of the information track, and said means for activating includes means for respectively moving the medium at high speeds in the reverse and forward directions in response to detection of the repeat and skip command signals.

23. The system of claim 5 wherein the operator station includes means for deriving numerical command signals indicative of desired locations for the medium, and means responsive to the numerical signals and detected numerical locations from the indicia on the medium for activating the moving means to move the medium at high speed until the medium is at the desired location.

24. The system of claim 23 further including means for deriving an output signal in response to the medium being at the desired location, and means responsive to the output signal for stopping the medium.

25. The system of claim 23 further including means for deriving an output signal in response to the medium being at the desired location, and means responsive to the output signal for activating the means for advancing to move the medium at the normal speed.

26. The system of claim 23 further including means for deriving an output signal in response to the medium being at the desired location, and means responsive to the output signal for selectively, in response to a supervisory control, stopping the medium and for activating the means for advancing to move the medium at the normal speed.

27. A system for automatically supplying information to an operator comprising a dynamic storage medium having at least one information track and a single coded data signal track, said coded data signal track having indicia for locations of the information in the information track, an operator station for deriving command signals for controlling movement of the medium, and means responsive to signals derived from the operator station and from the location indicia of the single coded data signal track for: (a) advancing the medium at a normal speed in the forward direction whereby the information is presented to the operator at a normal rate, and (b) moving the medium in the forward and reverse directions at high speeds such that no meaningful inforrmation is presented to the operator, the data track including coded numerical indications for a desired location to which the medium is to be driven, means for detecting the coded numerical indications, and means responsive to a command signal disassociated from the numerical indication for the desired location and the detected coded numerical indication for activating the means for moving so that the medium is moved at high speeds to the desired location.

28. The system of claim 27 further including means for providing a change in the medium movement in response to the medium reaching or passing the desired location.

29. The system of claim 28 wherein the means for providing the change includes means for disabling the high speed moving and normal speed advancing of the medium.

30. The system of claim 28 wherein the means for providing the change includes means for advancing the medium at the normal speed.

31. The system of claim 27 further including means for activating the moving means to return the medium at high speeds to substantially the same location as it had prior to the medium being advanced to the desired location.

32. The system of claim 31 wherein the said means for activating the moving means to return the medium at high speeds is responsive to a command signal disassociated with said same location.

33. The system of claim 32 wherein said command signal is a clear signal.

34. The system of claim 31 wherein said command signal is a predetermined signal derived by the operator after the medium has been advanced through the information on the medium occurring immediately after the desired location.

35. A system for automatically supplying information to an operator comprising a dynamic storage medium having information and coded data signals recorded thereon, said coded data signals having indicia for locations of the information, an operator station for deriving command signals for controlling movement of the medium, and means responsive to signals derived from the operator station and from the location indicia for: (a) advancing the medium in the forward direction at a normal speed whereby the information is presented to the operator at a normal rate, and (b) moving the medium in the forward and reverse directions at high speeds such that no meaningful information is presented to the operator, said data signal including a command code for identifying the beginning of predetermined portions of the information on the medium, means for detecting the command code, and means responsive to the detected command code and a predetermined command signal for activating the means for moving so the medium moves at high speeds to the portion of the information track indicated by the detected command code.

36. The system of claim 35 wherein command signals are provided to repeat and skip certain portions of the information, and said means for activating includes means for respectively moving the medium at high speeds in the reverse and forward directions in response to detection of the repeat and skip command signals.

37. The system of claim 35 wherein the signal track includes a relatively constant frequency carrier while the medium is moving at a substantially constant speed, said carried having three predetermined envelope levels, two of said levels being associated with different binary values, and the third level being associated with clock pulses, said means responsive to the location indicia including: playback means responsive to the carrier, said playback means including means for detecting the three amplitude levels of the carrier, means responsive to the detected amplitude levels for deriving signals indicative of the magnitude of the binary data and of the occurrence of the clock pulses to derive a binary signal indicative of the coded data representing the information track location, means for deriving a signal indicative of a speed range for the medium, and means responsive to the speed range indicating signal for controlling response times of the detecting means.

38. A system for automatically supplying information to an operator comprising a dynamic storage medium having information and coded data signals recorded thereon, said coded data signals having indicia for locations of the information, an operator station for deriving command signals for controlling movement of the medium, means responsive to signals derived from the operator station and from the location indicia for: (a) advancing the medium in the forward direction at a normal speed whereby the information is presented to the operator at a normal rate, and (b) moving the medium in the forward and reverse directions at high speeds such that no meaningful information is presented to the operator, the operator station including means for deriving numerical signals indicative of desired locations for the medium, means responsive to the numerical signals and detected numerical locations from the indicia on the medium for activating the moving means so the medium is moved at high speeds until the medium is at the desired location, means for deriving an output signal in response to the medium being at the desired location, and means responsive to the output signal for selectively, in response to a supervisory control, stopping the medium and for activating the means for advancing.

39. The system of claim 38 wherein the signal track includes a relatively constant frequency carrier while the medium is moving at a substantially constant speed, said carrier having three predetermined envelope levels, two of said levels being associated with different binary values, and the third level being associated with clock pulses, said means responsive to the location indicia including: playback means responsive to the carrier, said playback means including means for detecting the three amplitude levels of the carrier, means responsive to the detected amplitude levels for deriving signals indicative of the magnitude of the binary data and of the occurrence of the clock pulses to derive a binary signal indicative of the coded data representing the information track location, means for deriving a signal indicative of a speed range for the medium, and means responsive to the speed range indicating signal for controlling response times of the detecting means.

40. The system of claim 38 wherein said means for advancing and moving incluldes means for reading the coded data signal while the medium is advanced at normal speed and moved at high speeds.

41. A system for automatically supplying information to an operator comprising a dynamic storage medium having information and coded data signals recorded thereon, said coded data signals having indicia for locations of the information, an operator station for deriving command signals for controlling movement of the medium, means responsive to signals derived from the operator station and from the location indicia for: (a) advancing the medium in the forward direction at a normal speed whereby the information is presented to the operator at a normal rate, and (b) moving the medium in the forward and reverse directions at high speeds such that no meaningful information is presented to the operator, said data indicia including coded numerical indications for a desired location to which the medium is to be driven, means for detecting the coded numerical indications, and means responsive to a command signal disassociated from the numerical indication for the desired location and the detected coded numerical indications for activating the means for moving so that the medium is moved at high speeds to the desired location indicated by the detected indication.

42. The system of claim 41 further including means for providing a change in the medium movement in response to the medium reaching or passing the desired location.

43. The system of claim 41 wherein the signal track includes a relatively constant frequency carrier while the medium is moving at a substantially constant speed, said carrier having three predetermined envelope levels, two of said levels being associated with different binary values, and the third level being associated with clock pulses, said means responsive to the location indicia including: playback means responsive to the carrier, said playback means including means for detecting the three amplitude levels of the carrier, means responsive to the detected amplitude levels for deriving signals indicative of the magnitude of the binary data and of the occurrence of the clock pulses to derive a binary signal indicative of the coded data representing the information track location, means for deriving a signal indicative of a speed range for the medium, and means responsive to the speed range indicating signal for controlling response times of the detecting means.

44. The system of claim 41 wherein said means for advancing and moving includes means for reading the coded data signal while the medium is advanced at normal speed and moved at high speeds.

45. An audio-visual presentation system comprising a magnetic tape having diagonal video tracks thereon and an audio track extending longitudinally of the tape, said audio track having recorded thereon a single serial coded signal having indicia for locations of the video tracks, an operator station for deriving command signals for controlling longitudinal movement of the tape, means responsive to signals derived from the operator station and from the location indicia for: (a) longitudinally advancing the tape in the forward direction at a normal speed, and (b) moving the tape in the forward and reverse directions at high speeds, said means for advancing and moving including means for reading the single coded signal while the tape is advanced at normal speed and moved at high speeds, and means responsive to the video tracks and the tape being driven at the normal speed for deriving a video output signal susceptible to activate a television receiver.

46. The system of claim 45 wherein the coded signal audio track includes a relatively constant frequency audio carrier while the tape is moving at a substantially constant speed, said carrier having three predetermined envelope levels, two of said levels being associated with different binary values, and the third level being associated with clock pulses, said means responsive to the location indicia including: playback means responsive to the audio carrier, said playback means including means for detecting the three amplitude levels of the carrier, means responsive to the detected amplitude levels for deriving signals indicative of the magnitude of the binary data and of the occurrence of the clock pulses to derive a binary signal indicative of the coded data representing the information track location, means for deriving a signal indicative of a speed range for the tape, and means responsive to the speed range indicating signal for controlling response times of the detecting means.

47. A system for automatically supplying information to an operator comprising a dynamic storage medium having at least one information track and a single coded data signal track, said coded data signal track having indicia for locations of the information in the information track, means for deriving command signals for controlling movement of the medium, and means responsive to the command signals and the location indicia of the single coded data signal track for: (a) advancing the medium at a normal speed in the forward direction whereby the information is presented to the operator at a normal rate, and (b) moving the medium in the forward and reverse directions at high speeds such that no meaningful information is presented to the operator, said means for advancing and moving including means for reading the single coded data signal track while the medium is advanced at normal speed and moved at high speeds.

48. A system for automatically supplying information to an operator comprising a dynamic storage medium having recorded thereon information and coded data signals, said coded data signals having indicia for locations of the information recorded on the medium, means for deriving command signals for controlling movement of the medium, means responsive to the command signals and thee location indicia recorded on the medium for: (a) advancing the medium at a normal speed in the forward direction whereby the information is presented to the operator at a normal rate, and (b) moving the medium in the forward and reverse directions at high speeds such that no meaningful information is presented to the operator, said means for advancing and moving including means for reading the coded indicia while the medium is advanced at normal speed and moved at high speeds.

49. The system of claim 48 wherein the recorded coded data signal includes multi-bit binary words having first and second segments, said first segment including a first code indicative of the second code having a value commensurate with the medium location where the word is located and a second code indicative of the second segment having a value commensurate with a medium location to which the medium is to be driven, means recognizing the first and second codes and responsive to the command signals for activating the means for moving so that the medium is moved at high speed to the location indicated by the second segment of words having the second code.

50. The system of claim 49 further including means responsive to the segments of the words indicating the first and second codes for providing a change in the medium movement in response to the medium reaching or passing the location indicated by the second segment of the word including the second code.

51. The system of claim 49 further including means for activating the moving means to return the medium to substantially the same location as it had prior to the medium being advanced to the location indicated by the second segment of the word including the second code.

52. The system of claim 51 wherein the means for deriving the command signals includes an operator station, and wherein the means for activating the moving means to return the medium is responsive to a command signal disassociated from said same location.

53. The system of claim 52 wherein said command signal is a clear signal.

54. The system of claim 51 wherein said means for deriving command signals includes an operator station, and wherein said command signal is a predetermined signal derived from the operator station after the medium has been advanced through the information track immediately after the information indicated by the second segment of the word having the second code.

55. The system of claim 49 wherein said means for deriving command signals includes an operator station and plural command signals can be selectively coupled to the means for activating, means for deriving an output signal in response to the magnitude of values associated with a command signal being the same as successively detected words having the second code, and the means for activating causes the medium to move at high speed until the output signal is derived.

56. The system of claim 49 wherein the second segment of certain words having the first code includes indicia distinguishable from the locations, and means responsive to the distinguishable indicia and predetermined command signals for activating the moving means so that the medium is moved at high speed to substantially the location of the distinguishable indicia.

57. The system of claim 56 wherein the distinguishable indicia include command codes indicative of changing the motion of the medium, and means responsive to detection of a command code indicative of changing the motion of the medium for (a) deactivating the means for advancing at the normal speed, and (b) causing the medium to stop.

58. The system of claim 56 wherein the distinguishable indicia include command codes indicative of changing the motion of the medium, and means responsive to detection of a command code indicative of changing the motion of the medium, for (a) deactivating the means for moving at high speed, and (b) causing the medium to stop.

59. The system of claim 56 wherein the distinguishable indicia include command codes indicative of changing the motion of the medium, and means responsive to detection of a command code indicative of changing the motion of the medium for (a) deactivating the means for advancing at normal speed and moving at high speed, and (b) causing the medium to stop.

60. The system of claim 48 wherein the recorded data signal includes command codes indicative of changing the motion of the medium, and means responsive to detection of a command code indicative of changing the motion of the medium for (a) deactivating the means for advancing at normal speed, and (b) causing the medium to stop.

61. The system of claim 48 wherein the recorded data signal includes command codes indicative of changing the motion of the medium and means responsive to detection of a command code indicative of changing the motion of the medium for (a) deactivating the means for moving at high speeds, and (b) causing the medium to stop.

62. The system of claim 48 wherein the recorded data signal includes command codes indicative of changing the motion of the medium and means responsive to detection of a command code indicative of changing the motion of the medium for (a) deactivating the means for advancing at normal speed and moving at high speeds, and (b) causing the medium to stop.

63. The system of claim 48 wherein the recorded data signal includes a command code indicative of identifying the beginning of predetermined portions of the recorded information signal, and means responsive to said command code and a predetermined command signal for activating the means for moving so the medium moves at high speed to the predetermined portion of the recorded information signal indicated by the command code.

64. The system of claim 63 wherein the means for deriving command signals includes an operator station, the command signals derived from the operator station being indicative of repeating and skipping certain portions of the recorded information signal, and said means for activating includes means for respectively moving the medium at high speeds in the reverse and forward directions in response to detection of the repeat and skip command signals.

65. The system of claim 48 wherein the recorded coded data signal includes coded numerical indications for a desired location to which the medium is to be driven, and means responsive to a command signal disassociated from the numerical indication for the desired location and one of the coded numerical indications being detected for activating the means for moving so that the medium is moved at high speeds to the desired location.

66. The system of claim 65 further including means for activating the moving means to return the medium at high speeds to substantially the same location as it had prior to the medium being advanced to the desired location.

67. The system of claim 66 wherein said means for activating the moving means to return the medium at high speeds is responsive to a command signal disassociated from said same location.

68. The system of claim 67 wherein the means for deriving the command signal includes an operator station, said operator station including means for deriving a clear signal.

69. The system of claim 66 wherein the means for deriving the command signal includes an operator station, said operator station including means for deriving a predetermined signal after the medium has been advanced through the information on the medium occurring immediately after the desired location.

* * * * *